United States Patent
Ohyanagi et al.

(10) Patent No.: US 8,747,991 B2
(45) Date of Patent: Jun. 10, 2014

(54) OPTICAL DEVICE, METHOD FOR MANUFACTURING THE SAME AND DISPLAY DEVICE

(75) Inventors: Eiki Ohyanagi, Miyagi (JP); Hitoshi Watanabe, Miyagi (JP); Mikihisa Mizuno, Miyagi (JP); Masanori Nishiyama, Miyagi (JP)

(73) Assignee: Sony Corporation, Tokyo (JP)

( * ) Notice: Subject to any disclaimer, the term of this patent is extended or adjusted under 35 U.S.C. 154(b) by 636 days.

(21) Appl. No.: 12/645,628

(22) Filed: Dec. 23, 2009

(65) Prior Publication Data

US 2010/0167019 A1 Jul. 1, 2010

(30) Foreign Application Priority Data

Dec. 29, 2008 (JP) ................. 2008-335806

(51) Int. Cl.
*B32B 3/00* (2006.01)

(52) U.S. Cl.
USPC ............ 428/142; 428/141; 428/172; 428/148

(58) Field of Classification Search
USPC ......................................... 428/141, 143, 172
See application file for complete search history.

(56) References Cited

U.S. PATENT DOCUMENTS

| | | | | |
|---|---|---|---|---|
| 2002/0150722 A1* | 10/2002 | Suzuki | .......................... | 428/141 |
| 2005/0250927 A1* | 11/2005 | Pritschins et al. | .............. | 528/44 |
| 2007/0139783 A1* | 6/2007 | Furuya et al. | ................ | 359/606 |
| 2008/0152933 A1* | 6/2008 | Mizuno et al. | ................ | 428/480 |
| 2010/0028600 A1* | 2/2010 | Kojima et al. | ................ | 428/141 |
| 2010/0165460 A1* | 7/2010 | Furui et al. | .................... | 359/493 |
| 2010/0178469 A1* | 7/2010 | Onozawa et al. | ............. | 428/172 |

FOREIGN PATENT DOCUMENTS

| | | |
|---|---|---|
| JP | 59-109004 | 6/1984 |
| JP | 4-59605 | 9/1992 |
| JP | 3374299 | 11/2002 |
| JP | 2004-029240 | 1/2004 |
| JP | 2005-156615 | 6/2005 |
| WO | WO 2008020613 A1 * | 2/2008 |
| WO | WO 2008044398 A1 * | 4/2008 |
| WO | WO 2008146935 A1 * | 12/2008 |

* cited by examiner

*Primary Examiner* — Maria Veronica Ewald
*Assistant Examiner* — Nancy Rosenberg
(74) *Attorney, Agent, or Firm* — K&L Gates LLP

(57) ABSTRACT

An optical device is provided and includes a substrate having a three-dimensionally random concave-convex shape on the surface thereof, and a hard coat layer formed on the substrate, wherein a projection height with the maximum frequency on the substrate surface falls within the range of 1.5 μm or more and not more than 10 μm. Projections larger than the projection height with the maximum frequency on the substrate surface have a height falling within +3 μm from a central value of the projection height with the maximum frequency. A length RSm in a lateral direction of concaves and convexes on the substrate surface is 55 μm or more and not more than 500 μm.

13 Claims, 14 Drawing Sheets

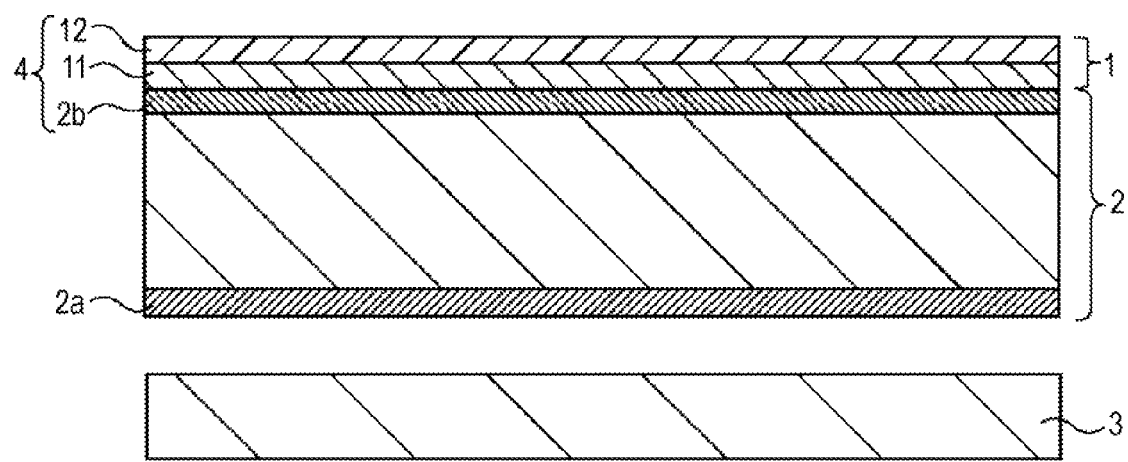

OPTICAL DEVICE, METHOD FOR MANUFACTURING THE SAME AND DISPLAY DEVICE

CROSS REFERENCES TO RELATED APPLICATIONS

The present application claims priority to Japanese Priority Patent Application JP 2008-335806 filed in the Japan Patent Office on Dec. 29, 2008, the entire content of which is hereby incorporated by reference.

BACKGROUND

The present disclosure relates to an optical device, a method for manufacturing the same and a display device. In detail, the present disclosure relates to a hard coat layer-provided optical device.

In recent years, various display devices such as a liquid crystal display (LCD) and a plasma display panel (PDP) have become widespread. In a screen of such a display device, visibility especially in a bright place is remarkably inhibited by glare of external light such as sunlight and indoor illumination, and therefore, an optical film such as an anti-glare film capable of diffusing and reflecting external light on the screen surface is frequently used.

In this optical film, there has hitherto been employed a technique for configuring a fine concave-convex structure on the surface for the purpose of diffusing and reflecting the external light on the screen surface. Specifically, taking into consideration scratch resistance, a method for coating a diffusion layer having transparent fine particles dispersed in a hard coat coating material on a transparent plastic substrate is the mainstream of current liquid crystal display devices.

However, in the foregoing various display devices represented by recent thin-model flat-screen television sets, enhancement of image quality and high definition are rapidly advanced, and pixels become small-sized. For that reason, there are involved such problems that light transmitting through the optical film receives a strain by reflection or diffusion by the fine particles in the anti-glare layer or the surface concave-convex structure, whereby the image becomes unclear, or glare is generated as a glare phenomenon of brightness; and that the surface becomes discolored with respect to the image quality, whereby the definition is remarkably deteriorated. In consequence, the current optical films in which the surface concave-convex structure is formed using fine particles cannot sufficiently follow the foregoing enhancement of image quality and high definition, and hence, realization of an optical film in which the surface concave-convex structure is formed without using fine particles is being desired.

Meanwhile, in order to diffuse and reflect external light on the screen surface, as techniques for forming a fine concave-convex structure on the surface, there have hitherto been studied techniques for forming a fine concave-convex structure by embossing (shape transfer) as disclosed in JP-B-4-59605, Japanese Patent No. 3374299, JP-A-2004-29240 and JP-A-2005-156615.

JP-B-4-59605 proposes a method in which a fine concave-convex rough surface is formed on the surface of a polarizing plate protective film made of a cellulosic plastic by embossing, and a part of the surface layer of the fine concave-convex rough surface is further dissolved by an organic solvent to manufacture a non-reflective polarizing plate with high sharpness.

Japanese Patent No. 3374299 proposes a method for manufacturing an anti-glare film in which a rough concave-convex layer made of an ionizing radiation-curable resin and fine concaves and convexes along the surface thereof are formed on a transparent plastic film. According to this manufacturing method, rough concaves and convexes thereof are formed by any one of an embossing method, a sandblasting method or a resin convection method at the time of drying, and fine concaves and convexes thereof are made of a coating layer in a thin film form or formed by a lifting effect.

JP-A-2004-29240 proposes a method for manufacturing an anti-reflection film capable of imparting concaves and convexes onto the film surface by embossing. According to this manufacturing method, a plate to be used for embossing is regulated so as to have an arithmetical average roughness of concaves and convexes of 0.05 μm or more and not more than 2.00 μm and an average period of concaves and convexes of not more than 50 μm.

JP-A-2005-156615 proposes a method for manufacturing an anti-glare film in which in a fabrication process of a thermoplastic resin film, a film is stretched by a tenter before or after forming concaves and convexes on the surface thereof upon pressing a casting mold against the film surface, and a hard coat layer is formed on the resulting concave-convex surface.

As described previously, in JP-B-4-59605, a non-reflective polarizing plate with high sharpness is formed as a polarizing protective film by partially dissolving a fine concave-convex rough surface formed on the surface of a cellulosic plastic upon embossing in an organic solvent, thereby making a smooth concave-convex surface. However, this non-reflective polarizing plate is inferior in scratch resistance because a hard coat layer is not formed on its surface, and therefore, it is difficult to use this non-reflective polarizing plate for liquid crystal display products which are required to have durability, such as liquid crystal television sets. Also, JP-B-4-59605 does not describe the surface shape upon which anti-glare properties are revealed.

In Japanese Patent No. 3374299 and JP-A-2004-29240, though the surface shape is specified in terms of a surface roughness, the arithmetical average roughness statistically includes large and small complicated concaves and convexes. For that reason, the diffusion and reflection characteristics are not controlled at all, and the resulting anti-glare film becomes discolored, thereby producing a problem that the image quality is remarkably deteriorated.

JP-A-2005-156615 proposes an anti-glare film in which in a fabrication process of a thermoplastic resin film, a casting mold is pressed against the film surface to transfer a concave-convex shape thereonto, and a hard coat layer is coated and formed on the film surface. However, with respect to the surface shape, only a center line average roughness Ra on the concave-convex surface of the thermoplastic resin is limited to the range of from 0.05 to 10 μm (see, for example, claim 11), but the surface shape upon which anti-glare properties are revealed is not described at all. In consequence, the diffusion and reflection characteristics are not controlled at all, and the resulting anti-glare film becomes discolored, thereby producing a problem that the image quality is remarkably deteriorated.

As described previously, in the related-art optical films for revealing anti-glare properties due to the surface shape without using fine particles, the surface properties are specified in terms of a mere concave-convex shape; the surface shape is specified in terms of a surface roughness (arithmetical average roughness); or the surface shape is specified merely by diffusion and reflection characteristics (optical characteristics). However, a definite surface shape is not specified.

In consequence, it is desirable to provide an optical device from which high anti-glare properties and high contrast are obtainable without using fine particles, a method for manufacturing the same and a display device.

SUMMARY

An excellent optical device is obtainable by preparing a master disc by blasting and preparing an optical device using this master disc according to an embodiment.

This optical device can be prepared in the following manner. First, a master disc is prepared by blasting. Subsequently, a concave-convex shape of this master disc is transferred onto a substrate. According to this, as shown in FIG. 1A, a substrate 101 in which a random concave-convex shape is formed is obtained. Projections of the surface of this substrate also have randomness in a height direction. Subsequently, as shown in FIG. 1B, a hard coat coating material 102 is coated on the substrate 101. Subsequently, as shown in FIG. 1C, the hard coat coating material 102 is dried to form a hard coat layer.

In blasting for achieving the processing by colliding fine processing particles with an object, random concaves and convexes can be formed on the surface of a master disc. For that reason, in an optical device prepared by using this master disc, the generation of moire can be prevented from occurring. However, the resulting optical device has three-dimensional randomness, namely it also has randomness in a thickness direction, and therefore, it is difficult to specify a surface shape formed by blasting in terms of an arithmetical average roughness (Ra) which has hitherto been employed for the purpose of specifying a surface concave-convex shape in anti-glare films and the like. According to the knowledge of the present inventors, in the case of specifying a surface shape formed by blasting in terms of an arithmetical average roughness (Ra), it is difficult to obtain desired anti-glare properties. Also, in the case of specifying the surface shape in terms of an arithmetical average roughness (Ra), there is a concern that a rough feel or a lumpy feel of the optical film is brought.

Then, in order to contrive to enhance the anti-glare properties and suppress the rough feel or lumpy feel of an optical film, the present inventors made extensive and intensive investigations regarding the concave-convex shape of the substrate surface. As shown in FIG. 1B, immediately after coating the hard coat coating material 102, the surface of the hard coat coating material 102 is flat; however, as shown in FIG. 1C, when the hard coat coating material 102 is dried, the surface shape becomes concave-convex, following concaves and convexes on the substrate surface. But, small concaves and convexes are hidden beneath the hard coat coating material and do not appear as the surface shape.

It has been found that it is possible to enhance anti-glare properties and suppress a rough feel or a lumpy feel of an optical device by specifying a surface shape of a substrate according to the following indexes.

(1) A projection height with the maximum frequency on the substrate surface (2) A range of projections larger than the projection height with the maximum frequency on the substrate surface (3) A length RSm in a lateral direction of concaves and convexes on the substrate surface According to a first embodiment, there is provided an optical device including:

a substrate having a three-dimensionally random concave-convex shape on the surface thereof; and a hard coat layer formed on the substrate, wherein a projection height with the maximum frequency on the substrate surface falls within the range of 1.5 µm or more and not more than 10 µm;

projections larger than the projection height with the maximum frequency on the substrate surface have a height falling within +3 µm from a central value of the projection height with the maximum frequency; and a length RSm in a lateral direction of concaves and convexes on the substrate surface is 55 µm or more and not more than 500 µm.

According to a second embodiment, there is provided an optical device including:

a substrate having a three-dimensionally random concave-convex shape on the surface thereof; and a hard coat layer formed on the substrate, wherein a projection height with the maximum frequency on the hard coat layer surface falls within the range of 0.1 µm or more and not more than 5 µm;

projections larger than the projection height with the maximum frequency on the hard coat layer surface have a height falling within +1 µm from a central value of the projection height with the maximum frequency; and a length RSm in a lateral direction of concaves and convexes on the hard coat layer surface is 55 µm or more and not more than 500 µm.

According to a third embodiment, there is provided a method for manufacturing an optical device including the steps of:

preparing a master disc having a three-dimensionally random concave-convex shape on the surface thereof by blasting;

transferring the concave-convex shape of the master disc onto a substrate; and forming a hard coat layer on the substrate by coating a hard coat coating material on the surface of the substrate on which the concave-convex shape is formed and curing it, wherein a projection height with the maximum frequency on the substrate surface falls within the range of 1.5 µm or more and not more than 10 µm;

projections larger than the projection height with the maximum frequency on the substrate surface have a height falling within +3 µm from a central value of the projection height with the maximum frequency; and a length RSm in a lateral direction of concaves and convexes on the substrate surface is 55 µm or more and not more than 500 µm.

According to the first to third embodiments, since the concave-convex shape of the surface is specified in terms of a projection height with the maximum frequency on the substrate surface or the hard coat layer surface; a width of projections larger than the projection height with the maximum frequency on the substrate surface or the hard coat layer surface; and a length RSm in a lateral direction of concaves and convexes on the substrate surface or hard coat layer surface, the surface concave-convex shape with three-dimensional randomness can be adequately specified. That is, by specifying the surface concave-convex shape in terms of the foregoing three indexes, smooth waviness is formed on the hard coat layer surface, whereby light can be diffused by this waviness. Also, since the hard coat layer does not contain fine particles, it is possible to enhance transmittance of light and obtain a high contrast as compared with the related-art optical devices which reveal anti-glare properties by projecting fine particles from the surface. Also, since concaves and convexes of the surface are formed at random, the generation of moire can be suppressed.

As described previously, according to embodiments, an optical film having high anti-glare properties and high contrast can be realized because not only light can be diffused by smooth waviness on the hard coat layer surface, but light transmittance of the hard coat layer is high.

Additional features and advantages are described herein, and will be apparent from the following Detailed Description and the figures.

BRIEF DESCRIPTION OF THE FIGURES

FIG. 2 shows an example of a configuration of a liquid crystal display device according to Embodiment 1.

DETAILED DESCRIPTION

Figure 1A:
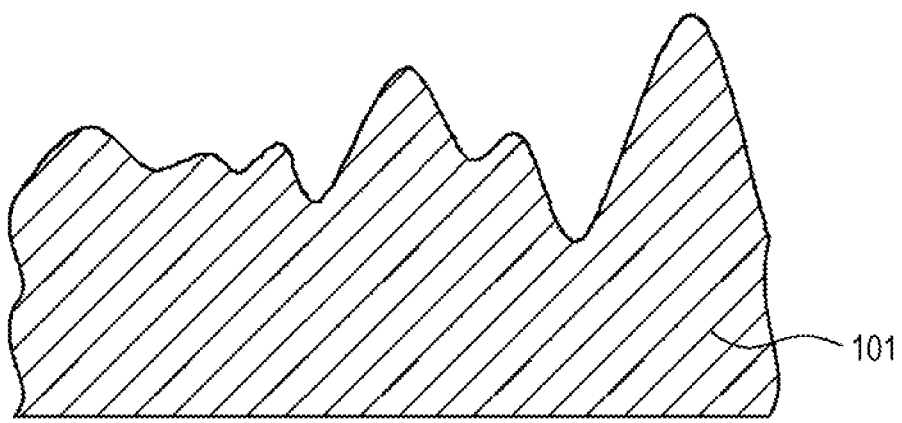
FIGS. 1A to 1C are each a process diagram for explaining a manufacturing method of an optical film.
Figure 1B:
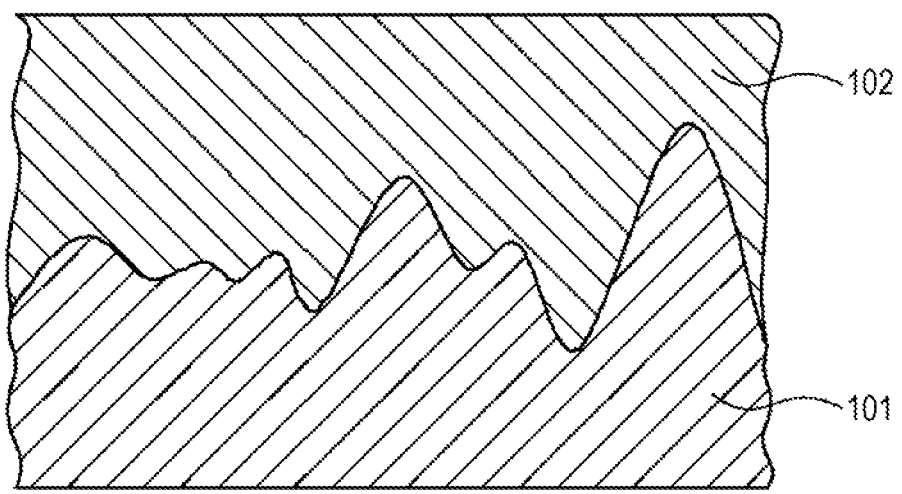
Figure 1C:
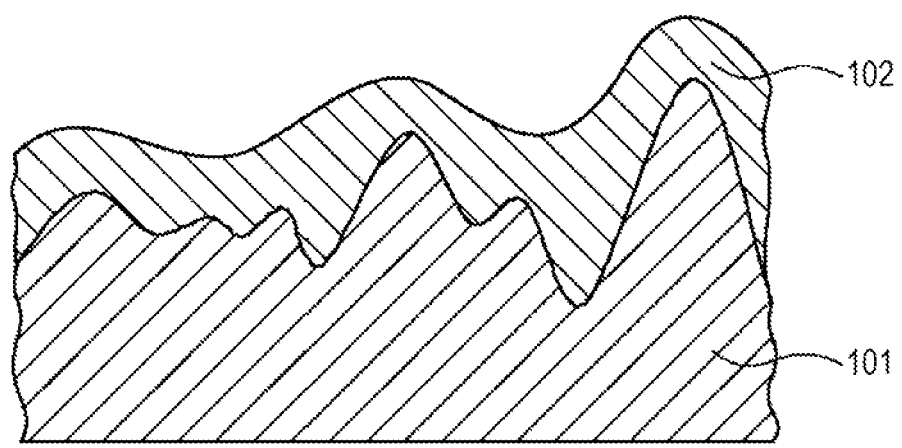

Embodiments are hereunder described in the following order with reference to the accompanying drawings. In all of the drawings of the following embodiments, the same or corresponding portions are given the same symbols, respectively.

(1) Embodiment 1 (an example of an anti-glare film)
(2) Embodiment 2 (an example in which an anti-reflection layer is further formed on the surface)
(3) Embodiment 3 (a first example of an ANR film)
(4) Embodiment 4 (a second example of an ANR film)
(5) Embodiment 5 (an example in which concaves and convexes are continuously transferred onto the substrate surface by a roll system)

1. Embodiment 1

Configuration of Liquid Crystal Display Device

FIG. 2 shows an example of a configuration of a liquid crystal display device according to Embodiment 1. As shown in FIG. 2, this liquid crystal display device is provided with a backlight 3 for outputting light and a liquid crystal panel 2 for temporally and spatially modulating the light outputted from the backlight 3 to display an image. Polarizers 2a and 2b are provided, respectively on the both surfaces of the liquid crystal panel 2. The polarizer 2b provided on the display surface side of the liquid crystal panel 2 is provided with an optical film (optical device) 1. Here, it is defined that the film includes not only those which have hitherto been called a film but those which are called a sheet. Also, the polarizer 2b in which the optical film 1 or a hard coat layer 12 is formed on the principal plane thereof is called an anti-glare polarizer 4.

As the backlight 3, for example, a direct type backlight, an edge type backlight, a planar light source type backlight and the like are useful. The backlight 3 is provided with a light source, a reflector plate, an optical film and the like. As the light source, for example, a cold cathode fluorescent lamp (CCFL), a hot cathode fluorescent lamp (HCFL), an organic electroluminescence (OEL), an inorganic electroluminescence (IEL), a light emitting diode (LED) and the like are useful.

As the liquid crystal panel 2, display modes, for example, a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, a phase change guest host (PCGH) mode, etc. are useful.

For example, the polarizers 2a and 2b are provided on the both surfaces of the liquid crystal panel 2 such that the transmission axes thereof are orthogonal to each other. The polarizers 2a and 2b make only one of polarizing components orthogonal to each other in the inputted light pass therethrough and block the other by absorption. As the polarizers 2a and 2b, for example, a polarizer obtained by adsorbing iodine or a dichroic material such as dichroic dyes on a polymer film and uniaxially stretching the resulting polymer film is useful.

[Configuration of Optical Film]

Figure 3:
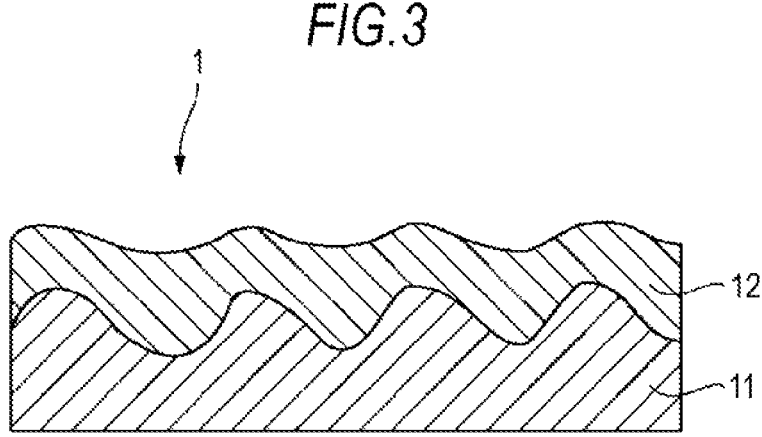
FIG. 3 is a sectional view showing an example of a configuration of an optical film according to Embodiment 1.

FIG. 3 is a sectional view showing an example of a configuration of the optical film 1 according to Embodiment 1. As shown in FIG. 3, this optical film 1 is provided with a substrate 11 and the hard coat layer 12 formed on this substrate 11. This optical film 1 is an anti-glare film having concaves and convexes on the surface thereof and capable of scattering reflected light by these concaves and convexes. This concave-convex shape of the surface is a three-dimensionally random concave-convex shape, and therefore, the generation of moire can be suppressed. Here, it is meant by the terms "three-dimensionally random" that not only concaves and convexes are randomly formed in an in-plane direction of the optical film 1, but concaves and convexes are randomly formed in a thickness direction (inverse direction to the concaves and convexes) of the optical film 1.

It is preferable that a projection height with the maximum frequency on the optical film surface falls within the range of 0.1 μm or more and not more than 5 μm. When the projection height with the maximum frequency on the optical film surface is smaller than 0.1 μm, the anti-glare properties are insufficient. On the other hand, when it is larger than 5 μm, a rough feel or a lumpy feel appears on the film, or anti-glare properties become too strong, whereby the resulting anti-glare film becomes discolored. It is preferable that projections larger than the projection height with the maximum frequency on the optical film surface have a height falling within +1 μm from a central value of the projection height with the maximum frequency. When the height of the projections larger than the projection height with the maximum frequency on the optical film surface falls outside the foregoing range, a rough feel or a lumpy feel appears on the film, or anti-glare properties become too strong, whereby the resulting anti-glare film becomes discolored. It is preferable that a length RSm in a lateral direction of concaves and convexes on the optical film surface is 55 μm or more and not more than 500 μm. When the length RSm falls outside the foregoing range, desired anti-glare properties are not obtainable.

(Substrate)

The substrate 11 is a plastic substrate with transparency. As to a shape of the substrate 11, for example, films or boards with transparency are useful. The substrate 11 has random concaves and convexes on the surface thereof. These concaves and convexes of the surface are those formed through shape transfer of a master disc prepared by blasting.

A projection height with the maximum frequency on the substrate surface falls within the range of 1.5 μm or more and not more than 10 μm. When the projection height with the maximum frequency on the substrate surface is less than 1.5 μm, it is difficult to obtain anti-glare properties while securing hardness of the hard coat layer. When it exceeds 10 μm, a rough feel or a lumpy feel appears on the film, or anti-glare properties become too strong, whereby the resulting anti-glare film becomes discolored. Projections larger than the projection height with the maximum frequency on the substrate surface have a height falling within +3 μm, and preferably within +2 μm from a central value of the projection height with the maximum frequency. When the height of projections larger than the projection height with the maximum frequency on the substrate surface falls within +3 μm from a central value of the projection height with the maximum frequency, not only a rough feel or a lumpy feel of the film is suppressed, but excellent anti-glare properties are obtainable. A length RSm in a lateral direction of concaves and convexes on the substrate surface is 55 μm or more and not more than 500 μm. When the length RSm falls outside the foregoing range, desired anti-glare properties are not obtainable.

As to a material of the substrate 11, for example, a known polymer material is useful. Specific examples of the known polymer material include triacetyl cellulose (TAC), a polyester (TPEE), polyethylene terephthalate (PET), a polyimide (PI), a polyamide (PA), aramid, polyethylene (PE), a polyacrylate, a polyethersulfone, a polysulfone, polypropylene (PP), diacetyl cellulose, polyvinyl chloride, an acrylic resin (PMMA), a polycarbonate (PC), an epoxy resin, a urea resin, a urethane resin, a melamine resin, a cycloolefin based resin (for example, ZONOR) and a styrene-butadiene copolymer (SBC). From the viewpoint of productivity, it is preferable that a thickness of the substrate 11 is from 38 to 100 μm, but it should be construed that the thickness of the substrate 11 is not particularly limited to this range.

(Hard Coat Layer)

The hard coat layer 12 is one for imparting both scratch resistance and anti-glare properties to the surface of the substrate 11, namely the surface of an optical film, a display device, etc. and is a polymer resin layer which is harder than the substrate 11. A continuous wave front is formed on the hard coat layer surface, following concaves and convexes of the substrate 11. For example, locations of a concave and a convex of the hard coat layer 12 are corresponding to those of the concave and the convex of the substrate 11, respectively. It is preferable that a continuous wave front is formed on the hard coat layer surface, following the concave-convex shape on the substrate surface. This is because adequate anti-glare properties can be revealed by diffusion of light by such a hard coat layer surface. A pencil hardness of the hard coat layer 12 is preferably 3H or more, and for example, 3H is selected.

(Manufacturing Method of Optical Film)

Next, an example of the manufacturing method of an optical film having the foregoing configuration is described with reference to FIGS. 4A to 4C and FIGS. 5A to 5C.

(Preparation Process of Master Disc)

Figure 4A:
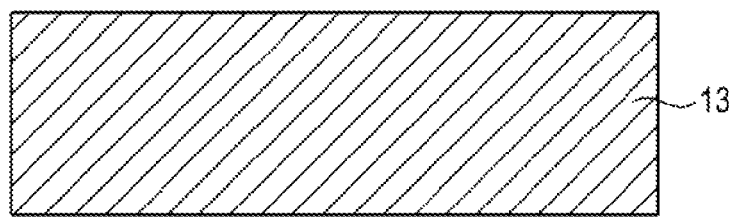
FIGS. 4A to 4C are each a sectional view for explaining an example of a manufacturing method according to Embodiment 1.
Figure 4B:
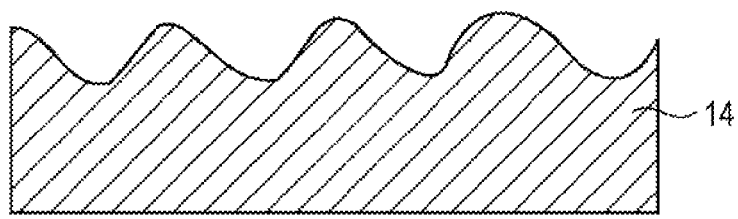

First of all, as shown in FIG. 4A, a substrate 13 which will work as a material to be processed is prepared. Examples of a shape of this substrate 13 include a board form, a sheet form, a film form and a block form. Also, examples of a material of the substrate 13 include a metal. Subsequently, a concave-convex shape is formed on the substrate surface by blasting. According to this, as shown in FIG. 4B, a master disc 14 having an inverse concave-convex shape to that of the substrate 11 is obtained.

(Transfer Process)

Figure 4C:
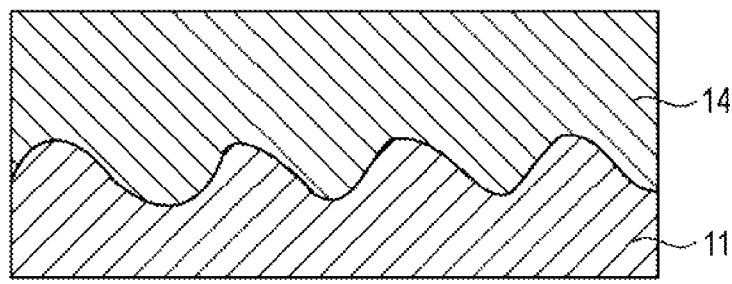

Subsequently, as shown in FIG. 4C, by pressing the master disc 14 against the substrate 11 and also heating the substrate 11, the concave-convex shape of the master disc 14 is transferred onto the substrate 11.

(Preparation Process of Coating Material)

Subsequently, for example, a resin raw material such as a bifunctional or polyfunctional monomer and/or oligomer, a photopolymerization initiator, a viscosity modifier and a solvent are mixed to prepare a hard coat coating material (resin). Here, all of other materials than the solvent and an organic viscosity modifier are defined as the solid content. Also, it is preferable that an anti-fouling additive is further added. This is because according to this, an anti-fouling hard coat can be formed. Also, a light stabilizer, an ultraviolet ray absorber, an antistatic agent, a flame retarder, an antioxidant and the like may be added, if desired.

(Coating Process)

Figure 5A:
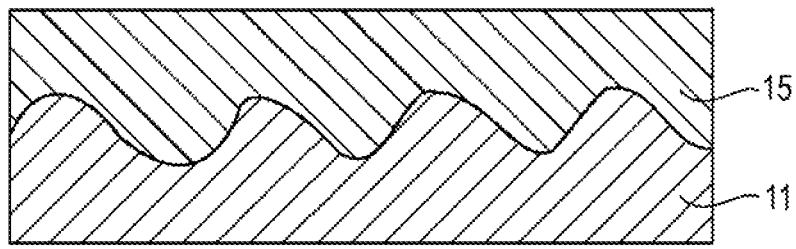
FIGS. 5A to 5C are each a sectional view for explaining an example of a manufacturing method according to Embodiment 1.

Subsequently, as shown in FIG. 5A, a prepared hard coat coating material 15 is coated on the substrate 11. It is preferable that a coating thickness of the hard coat coating material 15 is properly selected within the range of 3 μm or more and not more than 25 μm depending upon the projection height with the maximum frequency. Though the liquid level of the coated hard coat coating material 15 is leveled, the thickness from the concave-convex shape on the substrate surface is distributed, and therefore, a smooth, concave-convex gas-liquid interface is formed due to a change in volume at the time of drying. According to this, the optical film 1 in which the amount of concaves and convexes on the surface of the hard coat layer 12 is smaller than the amount of concaves and convexes on the surface of the substrate 11 can be obtained. Also, the amount of concaves and convexes on the surface of the substrate 11 is able to control the diffusion and reflection characteristics by the thickness of the hard coat coating material 15 to be coated. Furthermore, in all of the processes including from coating to curing, the surface can be formed in a non-contact state, and therefore, the optical film 1 with a high quality which is free from defects can be provided.

The coating method is not particularly limited, but a known coating method can be adopted. Examples of the known coating method include a micro gravure coating method, a wire bar coating method, a direct gravure coating method, a die coating method, a dip coating method, a spray coating method, a reverse roll coating method, a curtain coating method, a comma coating method, a knife coating method and a spin coating method.

(Resin Composition)

As the resin composition, one having characteristics such that its viscosity increases in a drying process as the post process, whereby the fluidity is lost is preferable. This is because the resin composition can be made to follow the concave-convex surface of the substrate 11 in the drying process as the post process. From the viewpoint of easiness of manufacture, it is preferable to use an ionizing radiation-curable resin composition which is curable with light or electron beams or the like, or a thermosetting resin composition which is curable with heat as the resin composition. The ionizing radiation-curable resin composition is preferably a photosensitive resin composition which is curable with light, and most preferably an ultraviolet ray-curable resin composition which is curable with ultraviolet rays. It is preferable that the ionizing radiation-curable resin composition or the thermosetting resin composition contains a viscosity modifier and a solvent. This is because when the resin composition contains these materials, the resin composition can be made to follow the concave-convex surface of the substrate 11 in the drying process as the post process.

(Ultraviolet Ray-Curable Resin Composition)

The ultraviolet ray-curable resin composition contains, for example, an acrylate, a photopolymerization initiator, a viscosity modifier and a solvent. Also, from the viewpoint of imparting anti-fouling properties, it is preferable that the ultraviolet ray-curable resin composition further contains an anti-fouling agent. Also, from the viewpoint of enhancing wettability with the substrate 11, it is preferable that the ultraviolet ray-curable resin composition further contains a leveling agent. Also, from the viewpoint of imparting an antistatic function to the anti-glare film 1, it is preferable that the ultraviolet ray-curable resin composition further contains an antistatic agent. Also, if desired, the ultraviolet ray-curable resin composition may further contain an organic or inorganic filler capable of imparting an internal haze to the hard coat. In such a way, when the filler is incorporated, a difference in refractive index between the filler and the matrix is preferably 0.01 or more. An average particle size of the filler is preferably from 0.1 μm to 1 μm. Also, if desired, the ultraviolet ray-curable resin composition may further contain a light stabilizer, a flame retarder, an antioxidant or the like.

The acrylate, photopolymerization initiator, viscosity modifier, solvent, antistatic agent, anti-fouling agent and leveling agent are hereunder described successively.

(Acrylate)

As the acrylate, it is preferable to use a monomer and/or an oligomer having two or more (meth)acryloyl groups. As this monomer and/or oligomer, for example, urethane (meth)acrylate, epoxy (meth)acrylate, polyester (meth)acrylate, polyol (meth)acrylate, polyether (meth)acrylate, melamine (meth)acrylate or the like can be used. The (meth)acryloyl group as referred to herein means any one of an acryloyl group or a methacryloyl group. The oligomer as referred to herein means a molecule having a molecular weight of 500 or more and not more than 60,000.

(Photopolymerization Initiator)

As the photopolymerization initiator, one which is properly selected among known materials can be used. As the known material, for example, a benzophenone derivative, an acetophenone derivative, an anthraquinone derivative or the like can be used singly or in combinations. A blending amount of the polymerization initiator is preferably 0.1% by mass or more and not more than 10% by mass in the solid content. What the blending amount of the polymerization initiator is less than 0.1% by mass is not substantially adaptive to the industrial production because of lowering in photocurability. On the other hand, when it exceeds 10% by mass, in the case where the irradiation light quantity is low, an offensive smell tends to remain in the coating film. The solid content as referred to herein means all of components constituting the hard coat layer 12 after curing, for example, all of components other than the solvent and the viscosity modifier. Specifically, for example, the acrylate, the photopolymerization initiator, the inorganic oxide filler, the antistatic agent, the leveling agent, the anti-fouling agent and the like are referred to as the solid content.

(Viscosity Modifier)

As the viscosity modifier (structural viscosity agent), for example, an inorganic and/or organic viscosity modifier can be used, and it is preferable to use the both in combinations. This is because when the both are used in combinations, the shape follow-up properties are enhanced. As the inorganic viscosity modifier, for example, an inorganic oxide filler can be used. Examples of the inorganic oxide filler which can be used include silica, alumina, zirconia, antimony pentoxide, zinc oxide, tin oxide, indium tin oxide (ITO), indium oxide, antimony-doped tin oxide (ATO) and aluminum zinc oxide (AZO). It is preferable that the surface of the inorganic oxide filler is subjected to a surface treatment with an organic dispersant having a functional group such as a (meth)acryl group, a vinyl group and an epoxy group in an end thereof. As the organic dispersant, for example, a silane coupling agent having the foregoing functional group in an end thereof is suitable. As the silane coupling agent having an acryl group in an end thereof, for example, KBM-5103, manufactured by Shin-Etsu Chemical Co., Ltd. can be exemplified. As the silane coupling agent having a methacryl group in an end thereof, for example, KBM-502, KBM-503, KBE-502 and KBE-503, all of which are manufactured by Shin-Etsu Chemical Co., Ltd., can be exemplified. As the silane coupling agent having a vinyl group in an end thereof, for example, KA-1003, KBM-1003 and KBE-1003, all of which are manufactured by Shin-Etsu Chemical Co., Ltd., can be exemplified. As the silane coupling agent having an epoxy group in an end thereof, for example, KBM-303, KBM-403, KBE-402 and KBE-403, all of which are manufactured by Shin-Etsu Chemical Co., Ltd., can be exemplified. In addition to the silane coupling agent, an organic carboxylic acid may be used. When such a surface treated inorganic oxide filler is used, the inorganic oxide filler is integrated with the surrounding acrylate such as a (meth)acrylic monomer and/or oligomer in a curing process of the coating film as described later, whereby hardness or flexibility of the coating film is enhanced.

It is preferable that the inorganic oxide filler has an OH group or the like on the surface thereof. According to this, in the drying process of the coating film as described later, the OH group or the like on the surface of the inorganic oxide filler and the functional group which the viscosity modifier has cause hydrogen bonding or coordinate bonding in an evaporation step of the solvent, whereby the viscosity of the coating material increases, and preferably the coating material is gelled. When the viscosity increases in such a way, the coating material follows the concave-convex shape of the substrate 11, whereby a concave-convex shape following the concave-convex shape of the substrate 11 is formed on the surface of the coating material.

An average particle size of the inorganic oxide filler is, for example, 1 nm or more and not more than 100 nm. A blending amount of the inorganic oxide filler is preferably 10% by mass or more and not more than 70% by mass in the solid content. Here, the whole of solids is defined as 100% by mass. When the blending amount of the inorganic oxide filler is less than 10% by mass, a high viscosity of the system is hardly achieved in the evaporation step of a solvent. Also, the amount of the viscosity modifier which is necessary for achieving a high viscosity is too high, whereby the coating material tends to become cloudy, or the hardness of the coating film tends to be deteriorated. On the other hand, when the blending amount of the inorganic oxide filler exceeds 70% by mass, flexibility of the cured film tends to become low.

As the organic viscosity modifier, for example, a molecule having a hydroxyl (OH) group, a carboxyl (COOH) group, a urea (—NH—CO—NH—) group, an amide (—NH—CO—) group or an amino ($NH_2$) group can be used, and it is preferable to use a molecule having two of more of at least one kind of functional group selected among these functional groups. Also, from the viewpoint of suppressing coagulation of the inorganic oxide filler, it is preferable to use a carboxyl group-containing molecule as the viscosity modifier. It is also possible to apply a known anti-sagging agent or anti-setting agent. In general, amide waxes, hydrogenated castor oils, oxidized polyethylene, polyethers and polyesters are used as the ant-sagging agent. In general, oxidized polyethylene which adsorbs on a pigment, amide waxes which form a structure by themselves and the like are used as the anti-setting agent. As the viscosity modifier, for example, BYK-405, BYK-410, BYK-411, BYK-420, BYK-425, BYK-430 and BYK-431, all of which are manufactured by BYK Japan KK; TALEN 1450, TALEN 2200A, TALEN 2450, FLOWNON SDR-80, FLOWNON SP-1000AF, FLOWNON SH-295S, FLOWLEN G-700 and FLOWLEN G-900, all of which are manufactured by Kyoeisha Chemical Co., Ltd.; and the like are suitable. A blending amount of the viscosity modifier is preferably from 0.001 to 5 parts by mass based on 100 parts by mass of the whole of coating materials. It is preferable to properly select an optimal blending amount depending upon the material species and blending amount of the inorganic oxide filler, the material species of the viscosity modifier and the desired film thickness of the hard coat.

(Solvent)

As the solvent, a solvent which dissolves therein the resin raw material to be used, such as an acrylate, has good wettability with the substrate 11 and does not whiten the substrate 11 is preferable. Examples of such a solvent include ketones or carboxylates such as acetone, diethyl ketone, dipropyl ketone, methyl ethyl ketone, methyl butyl ketone, methyl isobutyl ketone, cyclohexanone, methyl formate, ethyl formate, propyl formate, isopropyl formate, butyl formate, methyl acetate, ethyl acetate, propyl acetate, isopropyl acetate, butyl acetate, isobutyl acetate, sec-butyl acetate, amyl acetate, isoamyl acetate, sec-amyl acetate, methyl propionate, ethyl propionate, methyl butyrate, ethyl butyrate and methyl lactate; alcohols such as methanol, ethanol, isopropanol, n-butanol, sec-butanol and tert-butanol; and ethers such as tetrahydrofuran, 1,4-dioxane and 1,3-dioxolane. Such a solvent may be used singly or in admixture of two or more kinds thereof. Furthermore, other solvents than those exemplified above may be added so far as the performances of the resin raw material are not impaired.

(Antistatic Agent)

As described previously, it is preferable that the resin composition further contains an antistatic agent. It is preferable that at least one member of a quaternary ammonium salt, a conductive polymer, an ionic liquid and a conductive fine particle is contained as the antistatic agent.

As the quaternary ammonium salt, it is preferable to use a compound having a quaternary ammonium salt group in a molecule thereof. As the compound having a quaternary ammonium salt group in a molecule thereof, it is preferable to use a monomer and/or an oligomer having one or two or more quaternary ammonium salt groups and one or two or more (meth)acryloyl groups. In view of the fact that the compound has a quaternary ammonium salt group in a molecule thereof, an antistatic function can be imparted to the hard coat layer 12. Also, in view of the fact that the monomer and/or oligomer has a (meth)acryloyl group, it is integrated with the matrix resin or the like upon irradiation with ultraviolet rays. According to this, bleed-out of the quaternary ammonium salt can be suppressed.

Examples of the compound having a quaternary ammonium salt group in a molecule thereof include methacryloyloxyethyl trimethylammonium chloride, acryloyoxyethyl trimethylammonium chloride, acryloylaminopropyl trimethylammonium chloride, methacryloylaminopropyl trimethylammonium chloride, acryloyloxyethyl dimethylbenzylammonium chloride, methacryloyloxyethyl dimethylbenzylammonium chloride, methacryloylaminopropyl dimethylbenzylammonium chloride, methacryloyloxyethyl trimethylammonium methyl sulfate, methacryloylaminopropyl trimethylammonium methyl sulfate, methacryloyloxyethyl dimethylethylammonium ethyl sulfate, methacryloylaminopropyl dimethylethylammonium ethyl sulfate, methacryloyloxyethyl trimethylammonium p-toluenesulfonate and methacryloylaminopropyl trimethylammonium p-toluenesulfonate.

Examples of the conductive polymer include substituted or unsubstituted polyanilines, polypyrroles, polythiophenes and (co)polymers composed of one or two kinds selected among these polymers. In particular, polypyrrole, polythiophene, poly-N-methylpyrrole, poly-3-methylthiophene, poly-3-methoxythiophene, poly(3,4-ethylenedioxythiophene) and (co)polymers composed of one or two kinds selected among these polymers are suitable.

As the conductive polymer, it is preferable to select one having good compatibility with the ultraviolet ray-curable resin composition. When the compatibility is poor, the blending amount of the conductive polymer which is necessary for obtaining a desired antistatic performance becomes large, resulting in deterioration in mechanical characteristics, coloration (deterioration in transparency) and the like.

From the viewpoint of enhancing the conductivity, it is preferable that the conductive polymer contains a dopant. Examples of the dopant include halogen compounds, Lewis acids protonic acids. Specific examples include organic acids such as organic carboxylic acids and organic sulfonic acids, organic cyano compounds, fullerene, hydrogenated fullerene, carboxylated fullerene and sulfonated fullerene. Since a polystyrene sulfonate-doped polyethylenedioxythiophene solution is relatively high in heat stability and low in a degree of polymerization, it is preferable in view of the fact that transparency of the coating film after molding is advantageous.

(Anti-Fouling Agent)

As described previously, it is preferable that the resin composition further contains an anti-fouling agent. As the anti-fouling agent, it is preferable to use a silicone oligomer containing one or more groups of a (meth)acryl group, a vinyl group or an epoxy group and/or a fluorine-containing oligomer. In the case where it is required to impart alkali resistance to the anti-glare film 1, it is preferable to use a fluorine-containing oligomer. A blending amount of the foregoing silicone oligomer and/or fluorine-containing oligomer is preferably 0.01% by mass or more and not more than 5% by mass of the solid content. When the blending amount of the silicone oligomer and/or fluorine-containing oligomer is less than 0.01% by mass, the anti-fouling function tends to become insufficient. On the other hand, when it exceeds 5% by mass, the hardness of the coating film tends to become low. Examples of the anti-fouling agent which is preferably used include RS-602 and RS-751-K, all of which are manufactured by DIC Corporation; CN4000, manufactured by Sartomer Company; OPTOOL DAC-HP, manufactured by Daikin Industries, Ltd.; X-22-164E, manufactured by Shin-Etsu Chemical Co., Ltd.; FM-7725, manufactured by Chisso Corporation; EBECRYL 350, manufactured by Daicel-Cytec Company Ltd.; and TEGO Rad 2700, manufactured by Degussa.

(Leveling Agent)

As described previously, from the viewpoint of enhancing the wettability with the substrate 11, it is preferable the ultraviolet ray-curable resin composition contains a known leveling agent. It is preferable that a blending amount of the leveling agent is 0.01% by mass or more and not more than 5% by mass of the solid content. When the blending amount of the leveling agent is less than 0.01% by mass, the enhancement of the wettability tends to become insufficient. When it exceeds 5% by mass, the hardness of the coating film tends to become low.

(Drying Process)

Figure 5B:
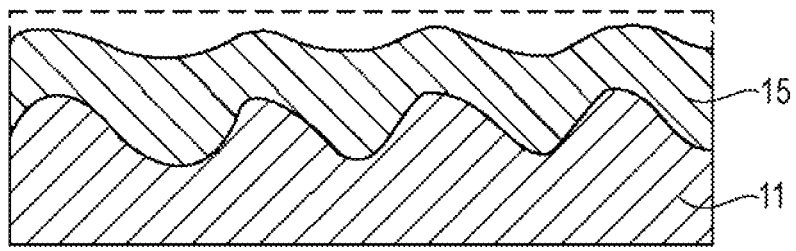

Subsequently, as shown in FIG. 5B, the hard coat coating material 15 coated on the substrate 11 is dried to volatilize the solvent. The drying condition is not particularly limited, but any of natural drying or artificial drying by regulating a drying temperature, a drying time, etc. may be adopted. However, in the case of blowing air against the coating material surface at the time of drying, it is preferable that a wind ripple pattern is not generated on the coating film surface. This is because when a wind ripple pattern is generated, there is a tendency that a desired fine concave-convex shape with gently waviness is hardly formed on the anti-glare layer surface and that it is difficult to make both anti-glare properties and contrast compatible with each other. Also, the drying temperature and the drying time can be properly determined by a boiling point of the solvent to be contained in the coating material. In that case, taking into consideration the heat resistance of the substrate 11, it is preferable that the drying temperature and the drying time are selected within the range where the substrate 11 is not deformed due to heat shrinkage.

(Curing Process)

Figure 5C:
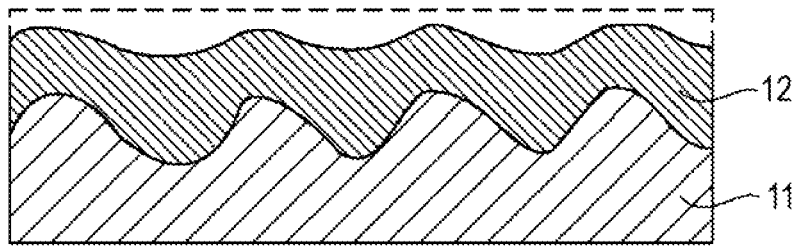

Subsequently, for example, the resin dried on the substrate 11 is cured upon irradiation with ionizing radiations or by heating. According to this, as shown in FIG. 5C, a smooth wave front can be formed on the surface of the hard coat layer 12. As the ionizing radiation, for example, electron beams, ultraviolet rays, visible radiations, gamma rays, electron beams and the like are useful. From the viewpoint of production equipment, ultraviolet rays are preferable. An accumulated irradiation dose can be properly selected while taking into consideration curing characteristics of the resin, suppression of yellowing of the resin or the substrate 11, and the like. Also, the atmosphere of irradiation can be properly selected according to a state of curing of the resin. Examples thereof include an atmosphere of an inert gas such as air, nitrogen and argon.

There is thus obtained the desired optical film.

According to Embodiment 1, the master disc 14 having a random concave-convex shape is prepared by a sandblasting method, etc., and this concave-convex shape of the master disc 14 is transferred onto the substrate 11. With respect to this concave-convex shape of the substrate 11, a projection height with the maximum frequency falls within the range of 1.5 µm or more and not more than 10 µm; projections larger than the projection height with the maximum frequency on the substrate surface have a height falling within +3 µm from a central value of the projection height with the maximum frequency; and a length RSm in a lateral direction of concaves and convexes is 55 µm or more and not more than 500 µm. In consequence, an optical film with high anti-glare properties and high contrast can be realized without using fine particles.

A hard coat coating material such as an ultraviolet ray-curable resin composition is coated on the substrate 11 having a concave-convex shape imparted thereto, dried and cured with ultraviolet rays, and the hard coat layer 12 is then formed, following the concave-convex shape. The reason why such a surface shape is formed resides in the fact that the solid content is gelled in the solvent evaporation step due to the action between the inorganic oxide filler contained in the composition and the viscosity modifier.

The hard coat coating material contains at least a resin raw material such as a bifunctional or polyfunctional monomer and/or oligomer, a photopolymerization initiator, an inorganic oxide filler, a viscosity modifier and a solvent. In the step where the solvent evaporates, the concentration of the solid content of the system increases, and the viscosity becomes high. In order that the hard coat coating material may follow the concave-convex shape of the substrate 11, it is preferable that the system is gelled in the solvent evaporation step. In the case where the system is not gelled, the concave-convex shape of the substrate 11 is broken so that it becomes difficult to obtain anti-glare properties. In view of the fact that the system is gelled, the concave-convex shape of the substrate 11 is left. When such a concave-convex shape is left, adequate smoothness is formed on the surface of the hard coat coating material, and anti-glare properties are revealed. The inorganic oxide filler and the viscosity modifier form a network via a hydrogen bond or a coordinate bond within the system, whereby the system is gelled.

2. Embodiment 2

Figure 6:
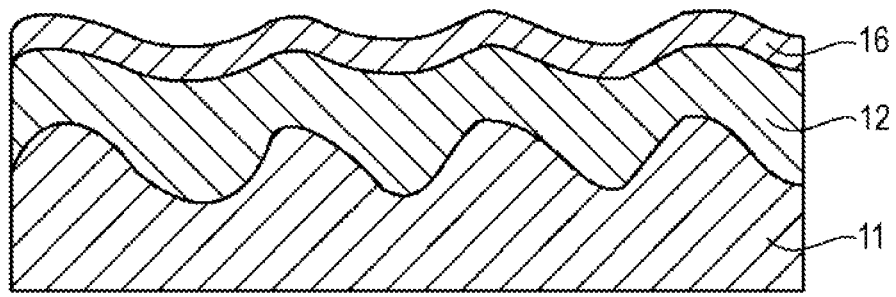
FIG. 6 is a sectional view showing an example of a configuration of an optical film according to Embodiment 2.

FIG. 6 is a sectional view showing an example of a configuration of an optical film according to Embodiment 2. As shown in FIG. 6, this optical film 1 is different from that of Embodiment 1 in the point that an anti-reflection layer 16 is provided on the hard coat layer 12. Since the substrate 11 and the hard coat layer 12 are the same as those in the foregoing Embodiment 1, respectively, the same symbols are given, and their explanations are omitted.

As the anti-reflection layer 16, for example, a low refractive index layer containing hollow fine particles or a low refractive index layer containing a fluorocarbon based resin is useful. Examples of the hollow fine particle include inorganic fine particles of silica, alumina, etc.; and organic fine particles of a styrene or acrylic resin, etc. Of these, silica fine particles are especially preferable. Since such a hollow fine particle contains air in the inside thereof, its own refractive index is low as compared with that of usual particles. For example, a silica fine particle has a refractive index, n=1.46, whereas a hollow silica fine particle has a refractive index, n≤1.45.

A coating material for forming the anti-reflection layer 16 may contain an inorganic oxide filler and a viscosity modifier. This is because when the coating material for forming the anti-reflection layer 16 contains these materials, the concave-convex shape of the anti-reflection layer 16 can be made to more follow the surface shape of the hard coat layer 12. As the inorganic oxide filler and the viscosity modifier, the same materials as those in Embodiment 1 are useful. As the coating material for forming a low refractive index layer containing hollow fine particles, for example, a coating material containing hollow fine particles, a resin raw material such as a bifunctional or polyfunctional monomer and/or oligomer, a photopolymerization initiator, an inorganic oxide filler, a viscosity modifier and a solvent is useful. As the coating material for forming a low refractive index layer containing a fluorocarbon based resin, for example, a coating material containing a fluorine-containing resin raw material such as a fluorine-containing monomer and/or oligomer, a photopolymerization initiator, an inorganic oxide filler, a viscosity modifier and a solvent is useful.

In this Embodiment 2, since the anti-reflection layer 16 is provided on the hard coat layer 12, it is able to enhance the anti-glare properties as compared with Embodiment 1.

3. Embodiment 3

In this Embodiment 3, the optical film used as the anti-glare film in the foregoing Embodiment 1 is used as an anti-Newton ring (ANR) film.

Figure 7:
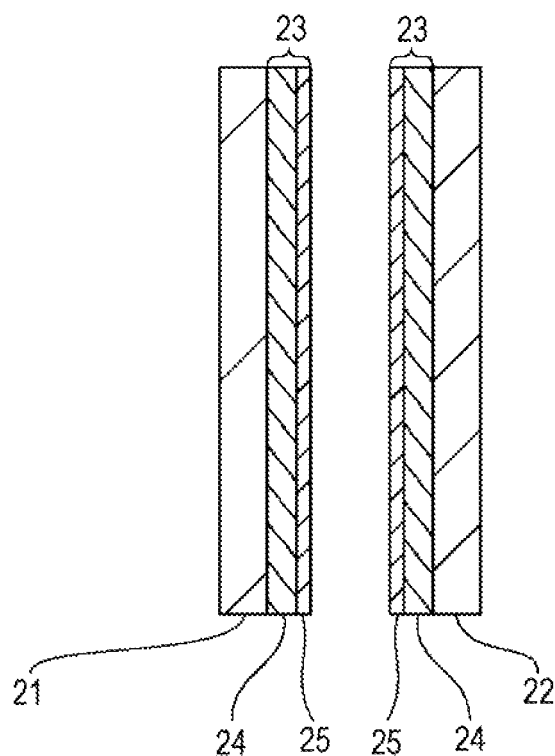
FIG. 7 is a sectional view showing a configuration example of a display device according to Embodiment 3.

FIG. 7 is a sectional view showing a configuration example of a display device according to Embodiment 3. This display device is provided with a display section 21 and a front member 22 provided on the front side of this display section 21. For example, an air layer is formed between the display section 21 and the front member 22. An optical film 23 is provided on at least one of the front side of the display section 21 and the back side of the front member 22. In FIG. 7, there is shown an example of a display device in which the optical film 23 is provided on both of the front side of the display section 21 and the back side of the front member 22. From the viewpoint of suppressing the generation of a Newton ring, it is preferable that the optical film 23 is provided on both of the front side of the display section 21 and the back side of the front member 22. The optical film 23 is stuck to the front member 22 or the display section 21 via a bonding agent or the like. In the present embodiment, the term "front" refers to the surface which will work as the display surface, namely the surface which will work the observer side; and the term "back" refers to the surface which will work the opposite side to the display surface.

As the display section 21, for example, a liquid crystal display, a CRT (cathode ray tube) display, a plasma display panel (PDP), an organic EL (electroluminescence) display, an inorganic EL display, a surface-conduction electron-emitter display (SED), a field emission display (FED) and the like are useful.

The front member 22 is used for the purpose of mechanical, thermal and weathering protections or design properties on the front (observer side) of the display section 21. For example, the front member 22 is in a sheet form, a film form or a plate form. As a material of the front member 22, for example, glass, triacetyl cellulose (TAC), a polyester (TPEE), polyethylene terephthalate (PET), a polyimide (PI), a polyamide (PA), aramid, polyethylene (PE), a polyacrylate, a polyethersulfone, a polysulfone, polypropylene (PP), diacetyl cellulose, polyvinyl chloride, an acrylic resin (PMMA), a polycarbonate (PC) and the like are useful. It should be construed that the material of the front member 22 is not particularly limited to these material, but any material with transparency is useful.

Figure 8:
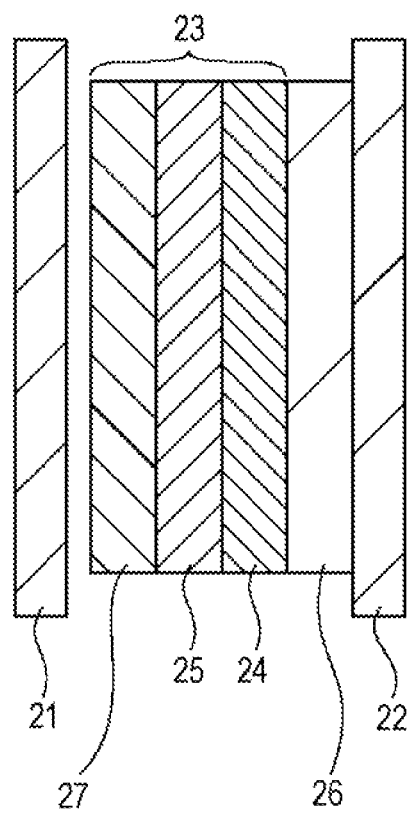
FIG. 8 is a sectional view showing an example of a configuration of an optical film according to Embodiment 3.

FIG. 8 is a sectional view showing an example of a configuration of an optical film. The optical film 23 is a film for suppressing the generation of a Newton ring in the display device. As shown in FIG. 8, the optical film 23 has a substrate 24 and a hard coat layer 25 provided on this substrate 24. The optical film 23 is stuck to an adherend such as the front member 22 via a bonding layer 26. The bonding layer 26 contains a bonding agent as a main component. As this bonding agent, a known bonding agent in the technical field of optical films is useful. In this specification, an adhesive such as a pressure sensitive adhesive (PSA) is also considered to be a kind of the bonding agent.

As the optical film 23, the same materials as those in the optical film 1 in Embodiment 1 are useful. Specifically, as the substrate 24 and the hard coat layer 25, the same materials as those in the substrate 11 and the hard coat layer 12 in Embodiment 1 are useful, respectively.

Also, as shown in FIG. 8, from the viewpoint of reducing the reflected light, it is preferable that an AR (anti-reflection) layer 27 is further formed on the hard coat layer 25. As the AR layer 27, any of a dry system or a wet system is useful, with a wet system being preferable. As the AR layer 27 of a wet system, for example, a layer containing a fluorocarbon based resin or a layer containing hollow fine particles of silica or the like is useful.

According to this Embodiment 3, by disposing the optical film 23 on at least one of the front side of the display section 21 and the back side of the front member 22, it is possible to suppress the generation of a Newton ring or to reduce the generation of a Newton ring to an extent that it is not conscious.

4. Embodiment 4

Figure 9:
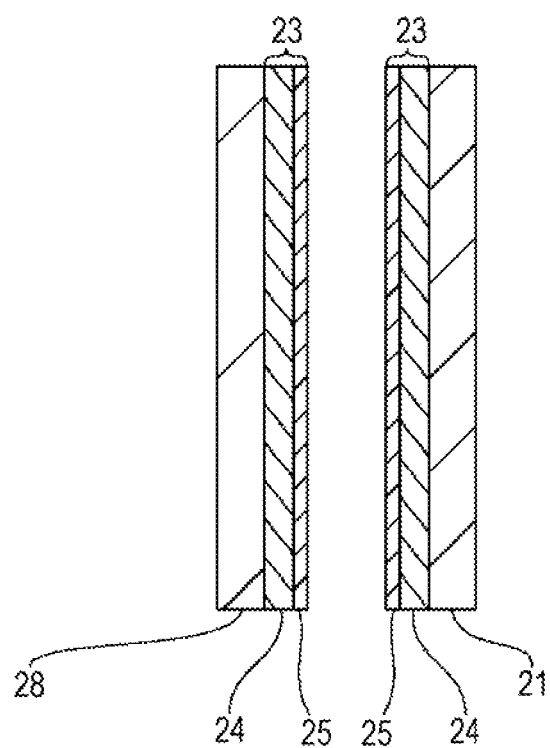
FIG. 9 is a sectional view showing a configuration example of a display device according to Embodiment 4.

FIG. 9 is a sectional view showing a configuration example of a display device according to Embodiment 4. This Embodiment 4 is different from Embodiment 3 in the point that the display device is provided with the display section 21 and a back member 28 provided on the back side of this display section 21 and provided with the optical film 23 on at least one of the back side of the display section 21 and the front side of the back member 28.

In FIG. 9, there is shown an example of a display device in which the optical film 23 is provided on both of the back side of the display section 21 and the front side of the back member 28. The same portions as those in the foregoing Embodiment 3 are given the same symbols, and their explanations are omitted.

For example, the back member 28 is in a sheet form, a film form or a plate form. In the case where the display section is a liquid crystal display, the back member 28 is, for example, a diffusing plate or a diffusing sheet for making the illuminance of a light source uniform within the plane, a lens film for controlling the viewing angle, a polarized light separating/reflecting film for polarizing and separating light from a light source and reusing the light, etc.

According to this Embodiment 4, by disposing the optical film 23 on at least one of the back side of the display section 21 and the front side of the back member 28, it is possible to suppress the generation of a Newton ring or to reduce the generation of a Newton ring to an extent that it is not conscious.

5. Embodiment 5

Embodiment 5 is different from Embodiment 1 in the point that concaves and convexes are continuously transferred onto the substrate by a roll system. The same portions as those in the foregoing Embodiment 1 are given the same symbols, and their explanations are omitted.

Figure 10:
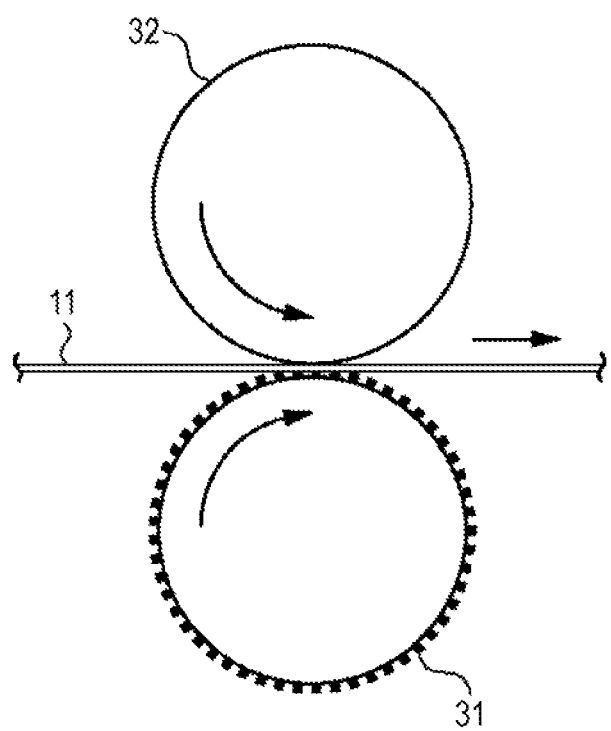
FIG. 10 is a schematic view showing an example of a configuration of an embossing transfer unit of a roll system.

FIG. 10 shows an example of a configuration of an embossing transfer unit of a roll system. As shown in FIG. 10, this embossing transfer unit is provided with an embossing roll 31 and a back roll 32.

As the embossing roll 31, a heating roll, for example, an induction heating jacket roll, a heat medium circulating roll, a heater-built-in roll, etc. is useful. As a method for embossing on the roll surface, it is preferable to adopt blasting. By adopting blasting, it is possible to form a three-dimensionally random concave-convex shape on the surface. In consequence, the generation of moire of the optical film 1 can be suppressed. Examples of the blasting include sandblasting and bead blasting. As the surface treatment, hard chromium plating and ceramic spraying are preferable because of excellent abrasion durability in long-term use.

The back roll 32 requires a high pressure for transferring a fine embossed pattern onto the substrate surface. Therefore, for example, it is preferable that a rubber layer having a rubber hardness of JIS-D80 or more or a resin layer having a hardness corresponding thereto is applied onto the surface of an iron roll, and the surface is then subjected to an abrasion treatment.

Also, it is preferable that the back roll 32 is cooled by circulating a coolant in the inside of the iron roll, or the surface of the rubber layer or the resin layer is cooled by using a cooling roll or a cooling nozzle. This is because a phenomenon in which the rubber layer or resin layer of the back roll 32 is continuously heat conducted from the embossing roll 31 during the embossing treatment, whereby the temperature increases to cause softening or melting of the substrate 11 can be prevented from occurring, and continuous embossing transfer becomes possible.

In Embodiment 5, other matters than the foregoing are the same as those in Embodiment 1.

According to this Embodiment 5, since a concave-convex pattern is continuously transferred onto the substrate 11 such as a board and a film by the embossing roll 31, the concave-convex pattern can be easily formed even on the substrate 11 with a large area. Also, since the pattern formation can be achieved by continuous transfer, the productivity can be enhanced, too.

EXAMPLES

Embodiments are hereunder specifically described with reference to the following Examples, but it should not be construed that the embodiments are limited to these Examples.

In the following Examples, a coating thickness of a hard coat layer and a surface roughness were measured in the following manners.

(Measurement of Coating Thickness of Hard Coat Layer)

A TAC film was coated with a resin in the same amount as that in a TAC film having a concave-convex shape transferred thereonto, and its coating thickness was measured by using a contact type thickness meter (manufactured by TESA K.K.). This coating thickness was defined as a coating thickness of hard coat layer.

(Measurement of Surface Roughness)

Figure 11:
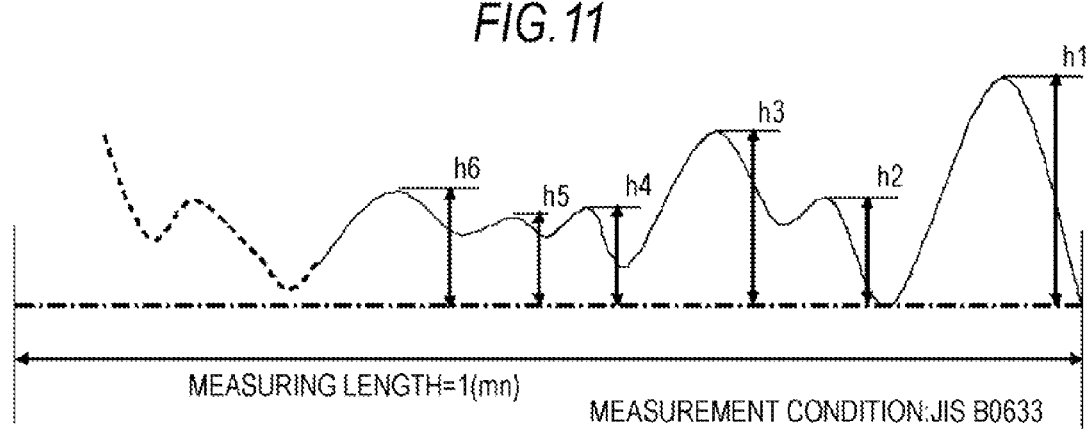
FIG. 11 is a schematic view showing an outline of the measurement of a surface roughness of a film.

FIG. 11 shows an outline of the measurement of a surface roughness of a film.

A surface shape of a film was measured according to a measurement condition of JIS B0633 as defined in the JIS standards. A SURF-CORDER ET-4000, manufactured by Kosaka Laboratory Ltd. was used as a measuring instrument. Distribution of projection height is obtained by extracting heights (h1, h2, h3, h4 . . . ) of peaks of wave crests on the basis of the lowest wave trough among the measuring lengths based on height data obtained from the measuring instrument and totalizing the appearance frequency at every 0.3 μm. Also, a length RSm in a lateral direction of concaves and convexes is measured at the same time.

Details of the measurement condition are shown below.

Stylus: Tip R=0.5 μm R
Measuring length: 4 mm
Feeding rate: 0.1 mm/s

The working examples of the present invention are described in the following order.

(1) Studies on projection height with the maximum frequency, etc.
(2) Studies on hard coat coating material <(1) Studies on Projection Height, Etc.>

When a hard coat coating material is coated on the concave-convex surface of a substrate, small concaves and convexes are hidden beneath the coating material and do not appear as the surface shape, and therefore, such small concaves and convexes do not substantially contribute to anti-glare properties. For that reason, samples having different projection height distribution of a film were prepared and evaluated with respect to their anti-glare properties.

(Sample 1-1)
(Formation Process of Master Disc)

First of all, an embossing transfer unit having the configuration shown in FIG. 10 was prepared. An embossing roll of this unit was prepared by so-called sandblasting for blowing an abrasive while rotating a roll. The blasting condition is shown below.

Blasting: Sandblasting
Abrasive: Corresponding to No. 200 mesh
Repeated work: One time (Formation Process of Substrate)

Figure 12:
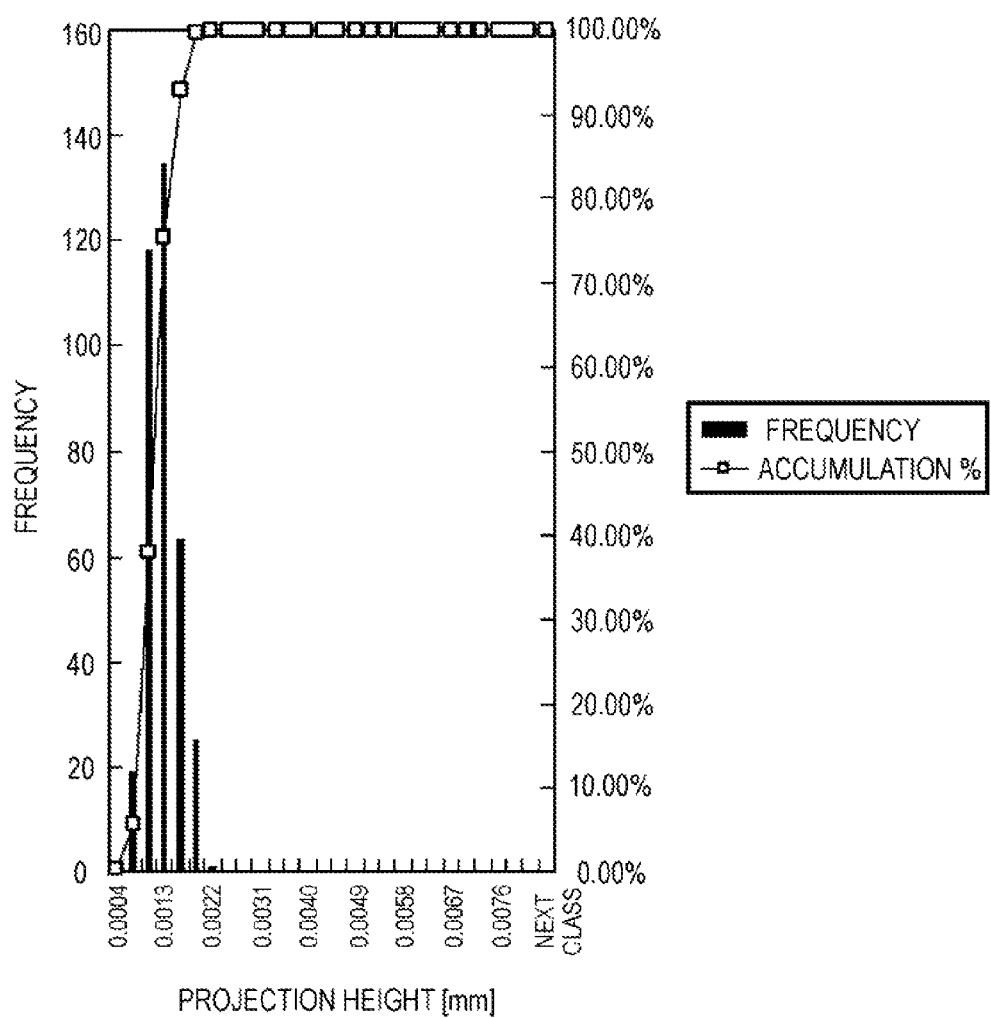
FIG. 12 is a graph showing frequency distribution of a projection height on the substrate surface of Sample 1-1.

Subsequently, concaves and convexes were formed on the TAC film surface by shape transfer (embossing) of the surface shape of the embossing roll which had been prepared by blasting. Subsequently, a surface roughness of the substrate was measured. The results are shown in FIG. 12.

(Formation Process of HC Layer)

Subsequently, the following ultraviolet ray-curable resin composition was coated on the TAC film having concaves and convexes imparted thereto by using a coil bar and then dried at 50° C. for 2 minutes. Subsequently, ultraviolet rays of 350 mJ/cm$^2$ were irradiated in a nitrogen atmosphere to obtain a 6 μm-thick anti-glare hard coat film provided with anti-fouling properties.

Urethane acrylic oligomer: 36.6 parts by weight
Pentaerythritol tetraacrylate: 18.3 parts by weight
Silica filler (acryl-modified) having a particle size of 25 nm: 40 parts by weight
IRGACURE 184: 5 parts by weight
Fluorine-containing oligomer (bifunctional acryl): 0.1 parts by weight BYK-410 (special modified urea solution): 1.9 parts by weight
IPA: 93.7 parts by weight
Cyclohexanone: 54.4 parts by weight
There was thus obtained a desired optical film.

(Sample 1-2)
An optical film was obtained in the same manner as in Sample 1-1, except for changing the thickness of the hard coat layer to 5.6 μm.

(Sample 1-3)
An optical film was obtained in the same manner as in Sample 1-1, except for changing the thickness of the hard coat layer to 5.2 μm.

(Sample 1-4)
An optical film was obtained in the same manner as in Sample 1-1, except for changing the thickness of the hard coat layer to 1.3 μm.

Figure 13:
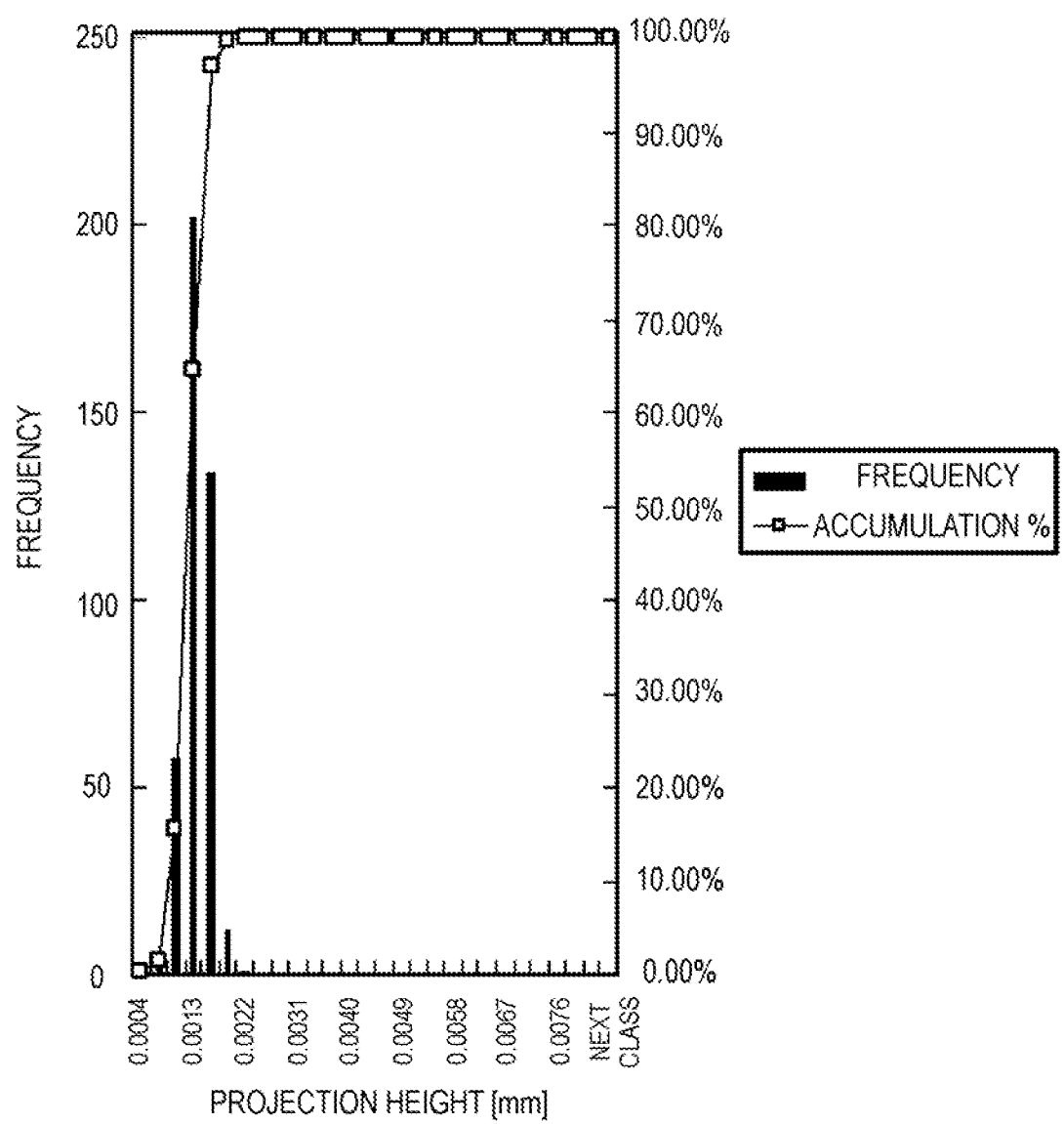
FIG. 13 is a graph showing frequency distribution of a projection height on the substrate surface of Sample 2-1.

(Sample 2-1)
A TAC film having concaves and convexes on the surface thereof was obtained in the same manner as in Sample 1-1, except for preparing an embossing roll under the following blasting condition.
Blasting: Bead blasting
Abrasive: Corresponding to No. 400 mesh
Bead: Glass beads
Repeated work: 6 times
Subsequently, a surface roughness of the substrate was measured. The results are shown in FIG. 13. Subsequently, a hard coat layer was formed on the concave-convex surface of the TAC film in the same manner as in Sample 1-1, thereby obtaining an optical film.

(Sample 2-2)
An optical film was obtained in the same manner as in Sample 2-1, except for changing the thickness of the hard coat layer to 7.5 μm.

(Sample 2-3)
An optical film was obtained in the same manner as in Sample 2-1, except for changing the thickness of the hard coat layer to 4.3 μm.

(Sample 2-4)
An optical film was obtained in the same manner as in Sample 2-1, except for changing the thickness of the hard coat layer to 3.2 μm.

Figure 14:
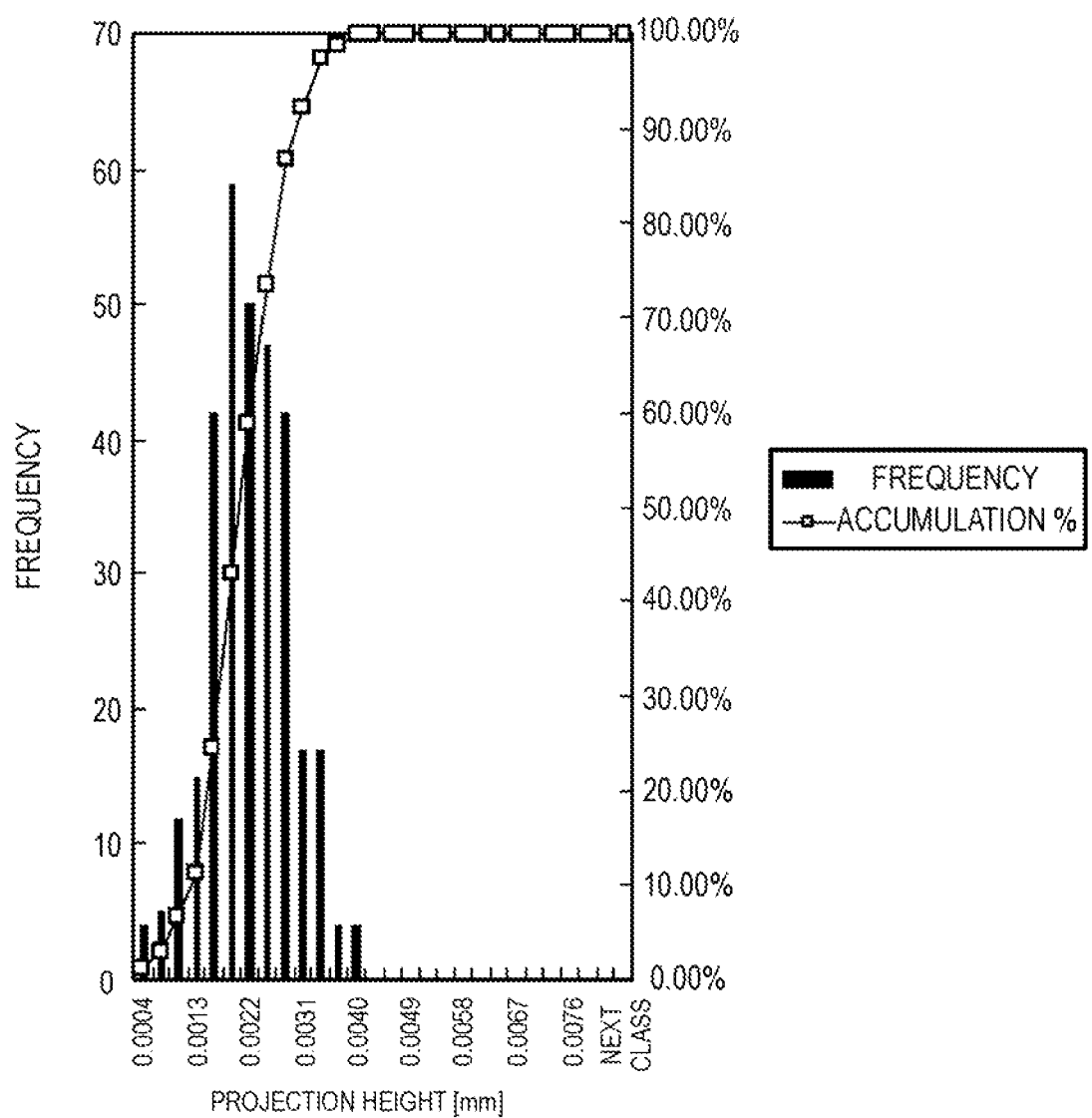
FIG. 14 is a graph showing frequency distribution of a projection height on the substrate surface of Sample 3-1.

(Sample 3-1)
A TAC film having concaves and convexes on the surface thereof was obtained in the same manner as in Sample 1-1, except for preparing an embossing roll under the following blasting condition.
Blasting: Bead blasting
Abrasive: Corresponding to No. 200 mesh
Bead: Glass beads
Repeated work: 8 times
Subsequently, a surface roughness of the substrate was measured. The results are shown in FIG. 14. Subsequently, a hard coat layer was formed on the concave-convex surface of the TAC film in the same manner as in Sample 1-1, thereby obtaining an optical film.

(Sample 3-2)
An optical film was obtained in the same manner as in Sample 3-1, except for changing the thickness of the hard coat layer to 3.7 μm.

Figure 15:
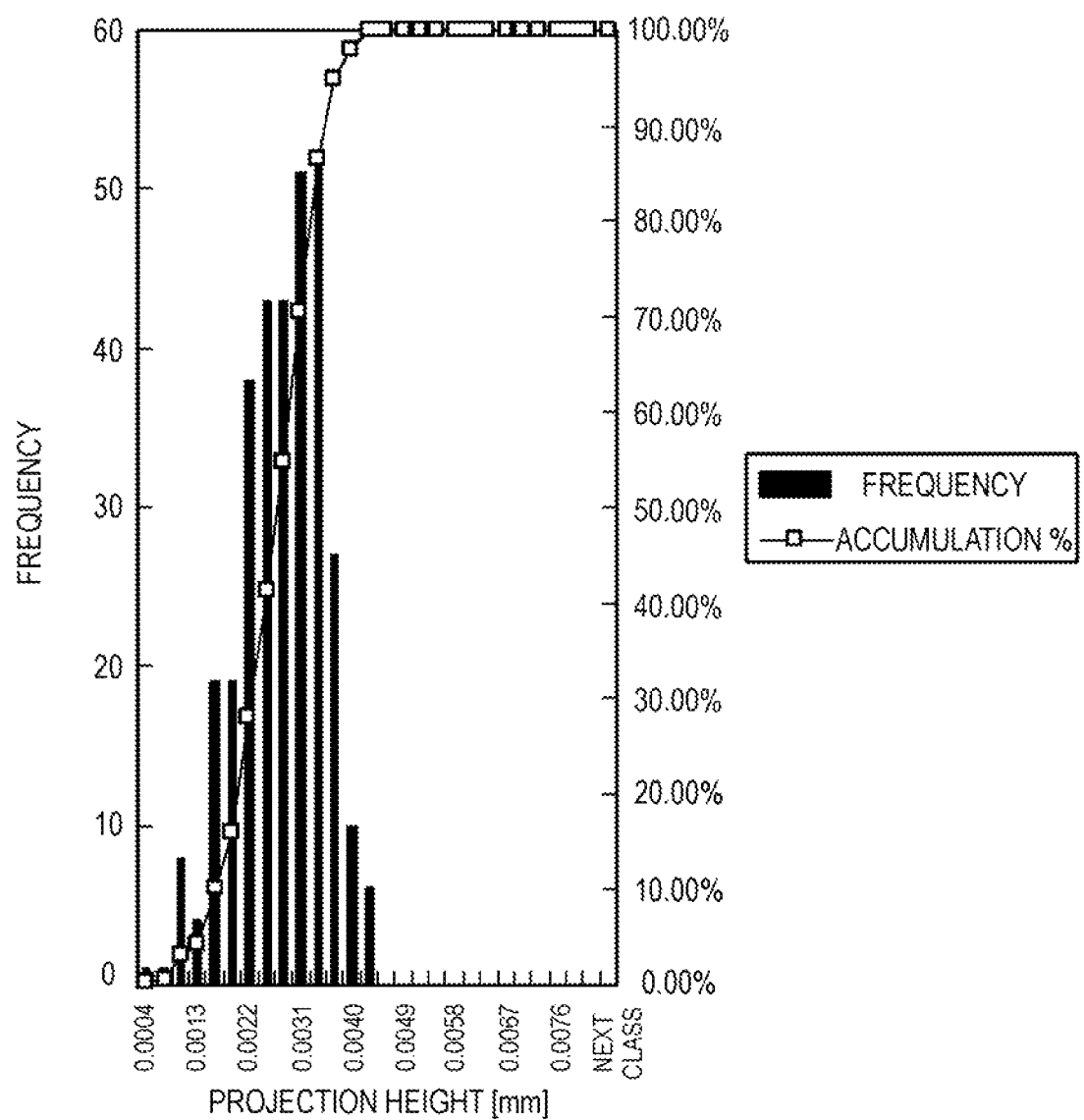
FIG. 15 is a graph showing frequency distribution of a projection height on the substrate surface of Sample 4.

(Sample 4)
A TAC film having concaves and convexes on the surface thereof was obtained in the same manner as in Sample 1-1, except for preparing an embossing roll under the following blasting condition.
Blasting: Bead blasting
Abrasive: Corresponding to No. 200 mesh
Bead: Glass beads
Repeated work: 12 times
Subsequently, a surface roughness of the substrate was measured. The results are shown in FIG. 15. Subsequently, a hard coat layer was formed on the concave-convex surface of the TAC film in the same manner as in Sample 1-1, thereby obtaining an optical film.

Figure 16:
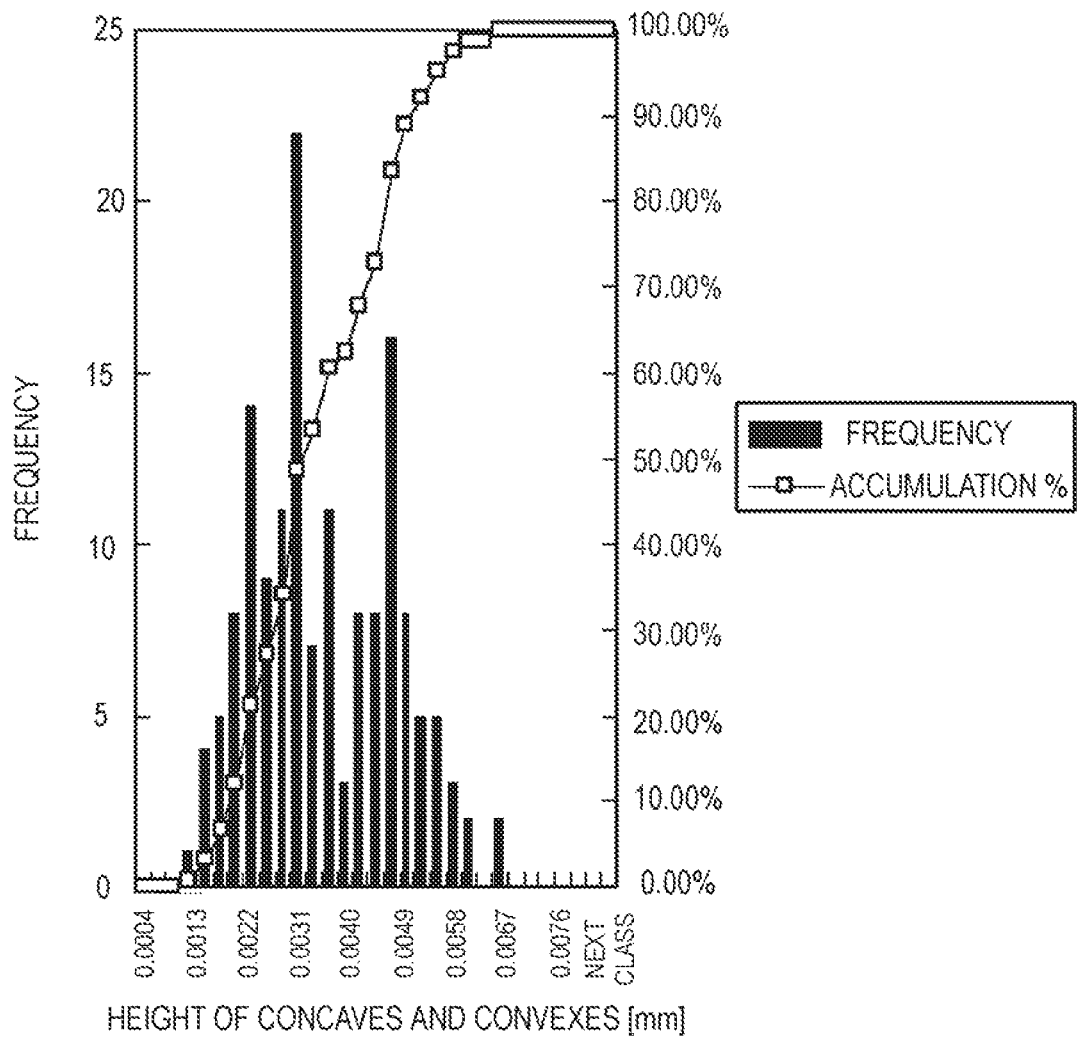
FIG. 16 is a graph showing frequency distribution of a projection height on the substrate surface of Sample 5.

(Sample 5)
An embossing roll was obtained in the same manner as in Sample 1-1, except for forming concaves and convexes on the surface thereof under the following blasting condition. Subsequently, a surface roughness of the embossing roll was measured. The results are shown in FIG. 16. Subsequently, an optical film was obtained in the same manner as in Sample 1-1, except for using this embossing roll.
Blasting: Bead blasting
Abrasive: Corresponding to No. 60 mesh
Bead: Glass beads
Repeated work: One time (Evaluation of Pencil Hardness)
Each of the optical films of the thus obtained Samples 1-1 to 5 was stuck onto a glass plate and evaluated according to the pencil hardness test method as defined in JIS K-5400. The results are shown in Table 1.

Figure 17:
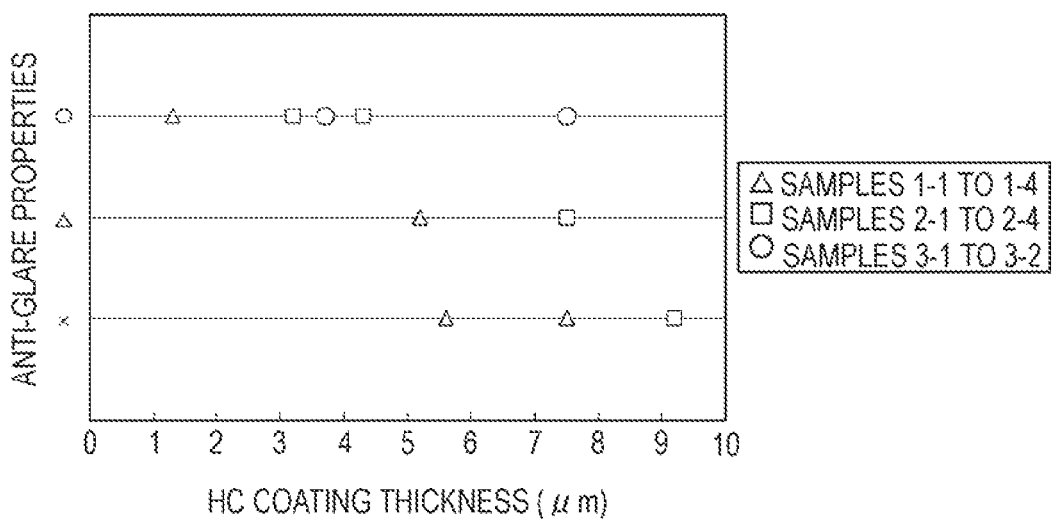
FIG. 17 is a graph showing the evaluation results of anti-glare properties of optical films of Samples 1-1 to 5-2.

(Evaluation of Anti-Glare Properties)
Anti-glare properties of each of the optical films of the thus obtained Samples 1-1 to 5 were evaluated as follows. That is, a bare fluorescent lamp was projected on the optical film, and blur of a reflected image was evaluated according to the following standards. The results are shown in FIG. 17.
○: The outline of the fluorescent lamp is not noted.
Δ: The fluorescent lamp can be recognized to some extent.
x: The fluorescent lamp glares as it is.
Table 1 shows the configuration and evaluation results of each of Samples 1-1 to 5.

TABLE 1

| | Substrate or master disc | | | | | HC layer | |
|---|---|---|---|---|---|---|---|
| | Projection | | | | | | |
| | height with the maximum frequency (μm) | Maximum projection height (μm) | Δh | RSm (μm) | Distribution of projection height | Coating thickness of HC (μm) | Pencil hardness |
| Sample 1-1 | 1.3 | 2.2 | 0.9 | 54 | FIG. 12 | 7.5 | 3H |
| Sample 1-2 | | | | | | 5.6 | 2H |
| Sample 1-3 | | | | | | 5.2 | 2H |
| Sample 1-4 | | | | | | 1.3 | H |
| Sample 2-1 | 1.3 | 2.2 | 0.9 | 62 | FIG. 13 | 9.2 | 3H |
| Sample 2-2 | | | | | | 7.5 | 3H |

TABLE 1-continued

|  | Substrate or master disc | | | | | HC layer | |
|---|---|---|---|---|---|---|---|
|  | Projection | | | | | | |
|  | height with the maximum frequency (μm) | Maximum projection height (μm) | Δh | RSm (μm) | Distribution of projection height | Coating thickness of HC (μm) | Pencil hardness |
| Sample 2-3 | | | | | | 4.3 | 2H |
| Sample 2-4 | | | | | | 3.2 | 2H |
| Sample 3-1 | 1.9 | 4.0 | 2.1 | 85 | FIG. 14 | 7.5 | 3H |
| Sample 3-2 | | | | | | 3.7 | 2H |
| Sample 4 | 3.4 | 4.3 | 0.9 | 76 | FIG. 15 | — | — |
| Sample 5 | 5.5 | 12.0 | 6.5 | 239 | FIG. 16 | — | — |

Δh: A difference between projection height with the maximum frequency and the highest projection height on the substrate surface The following are noted from FIG. 17.

As in Samples 1-1 to 1-4 and 2-1 to 2-4, even in the case where the projection height is small, when the hard coat layer is thin, anti-glare properties can be obtained; however, as in Sample 1-4, when the coating thickness of the hard coat coating material is not more than 3 μm, the pencil hardness cannot be sufficiently secured. When this point of issue is taken into consideration, in order to reveal anti-glare properties while securing the hardness of the hard coat layer, it is necessary that the projection height with the maximum frequency and the RSm of the sample exceed 1.3 μm and 54 μm, respectively. In consequence, in order to reveal anti-glare properties while securing the hardness of the hard coat layer, it is necessary that the projection height with the maximum frequency is 1.5 μm or more and that the RSm is 55 μm or more.

Also, the surface roughness state of Samples 3-1 to 3-2 and 4 is preferable. In these Samples 3-1 to 3-2 and 4, projections larger than the projection height with the maximum frequency on the substrate surface have a height of 2 μm from a central value of the projection height with the maximum frequency. In consequence, it is preferable that projections larger than the projection height with the maximum frequency on the substrate surface have a height falling within 2 μm from a central value of the projection height with the maximum frequency.

<(2) Studies on Hard Coat Coating Material>

An ultraviolet ray-curable resin composition (hard coat coating material) capable of forming the hard coat layer surface following the concave-convex shape of the substrate was studied.

(Sample 6)

Figure 18A:
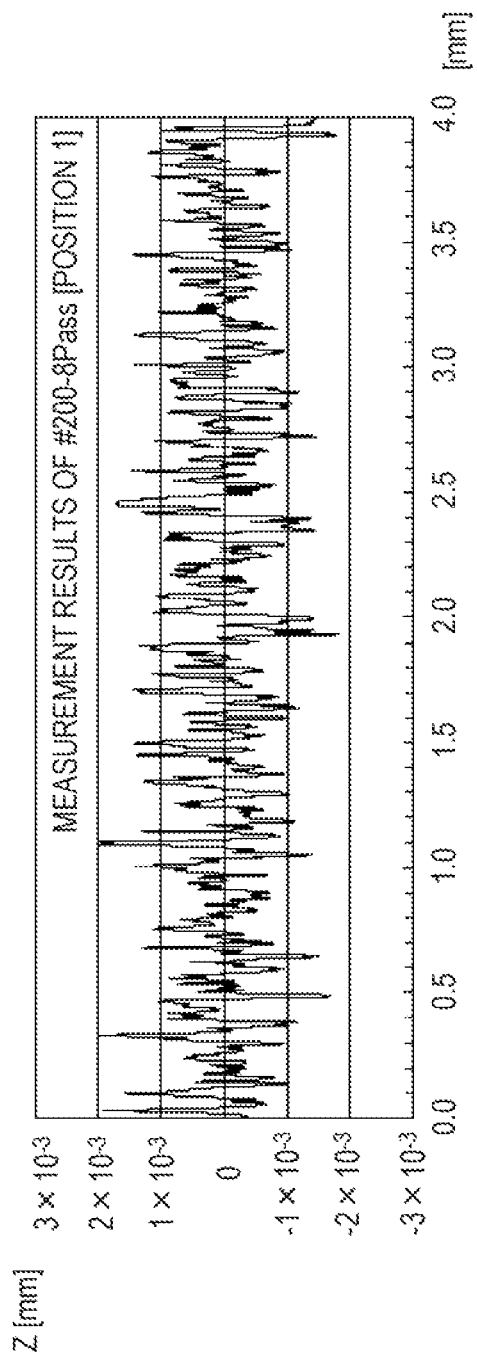
FIG. 18A is a graph showing a roughness curve of the substrate surface of Sample 6.
Figure 18B:
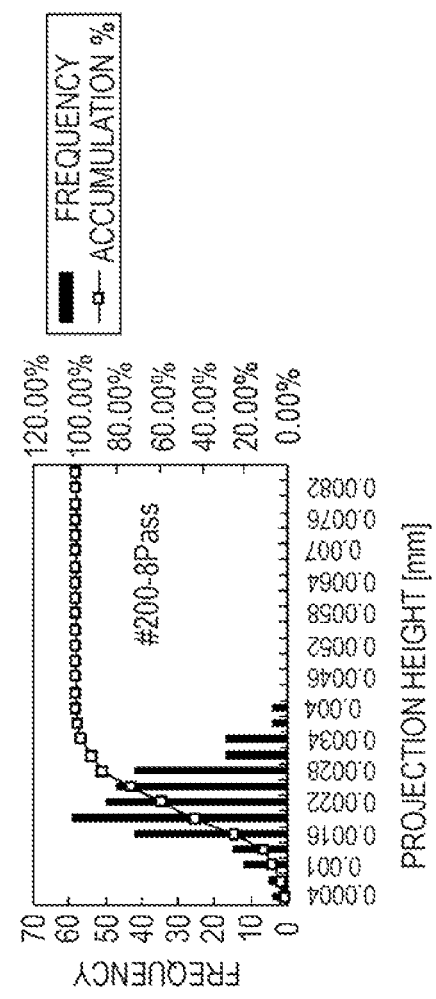
FIG. 18B is a graph showing frequency distribution of a projection height on the substrate surface of Sample 6.

First of all, concaves and convexes were formed on the TAC film surface by shape transfer (embossing) of a surface shape of an embossing roll which had been prepared by blasting. Subsequently, the surface shape was evaluated by a surface roughness measuring instrument with stylus (SURF-CORDER ET-4000, manufactured by Kosaka Laboratory Ltd.). The evaluation results are shown in FIGS. 18A and 18B. Ra (arithmetic average roughness) was 0.509 μm; Rz (ten-point average roughness) was 2.638 μm; and RSm (average length of roughness curve element) was 85 μm. Also, a projection height with the maximum frequency on the substrate surface was 1.9 μm; and projections higher than the projection height with the maximum frequency on the substrate surface had a height of 2.1 μm from a central value of the projection height with the maximum frequency.

The following ultraviolet ray-curable resin composition was coated on the TAC film having concaves and convexes imparted thereto by using a coil bar and then dried at 50° C. for 2 minutes. Subsequently, ultraviolet rays of 350 mJ/cm$^2$ were irradiated in a nitrogen atmosphere to obtain a 6 μm-thick anti-glare hard coat film provided with anti-fouling properties.

Figure 19A:
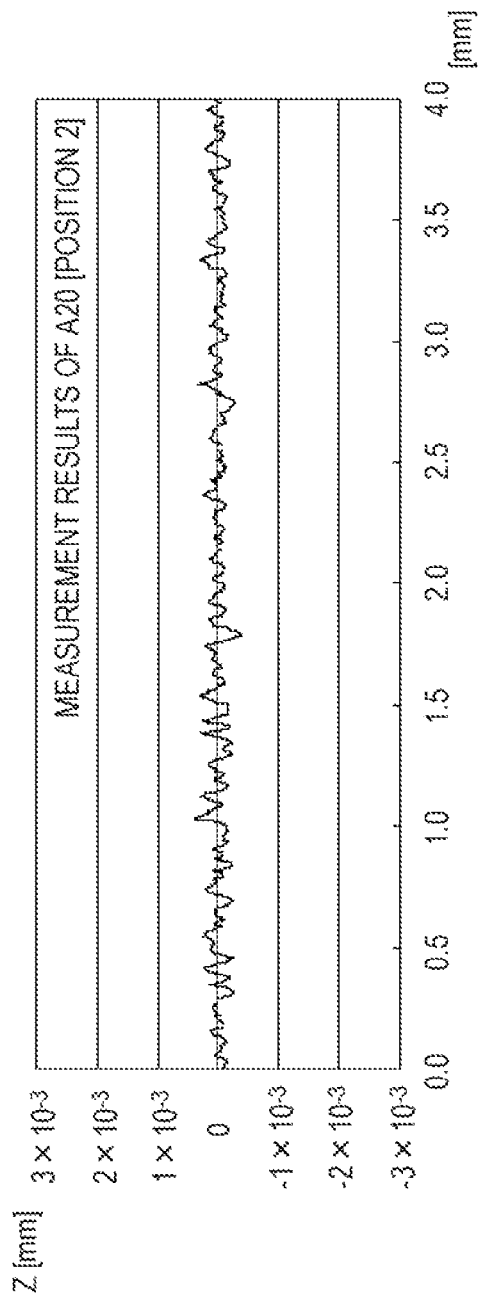
FIG. 19A is a graph showing a roughness curve of the optical film surface of Sample 6.
Figure 19B:
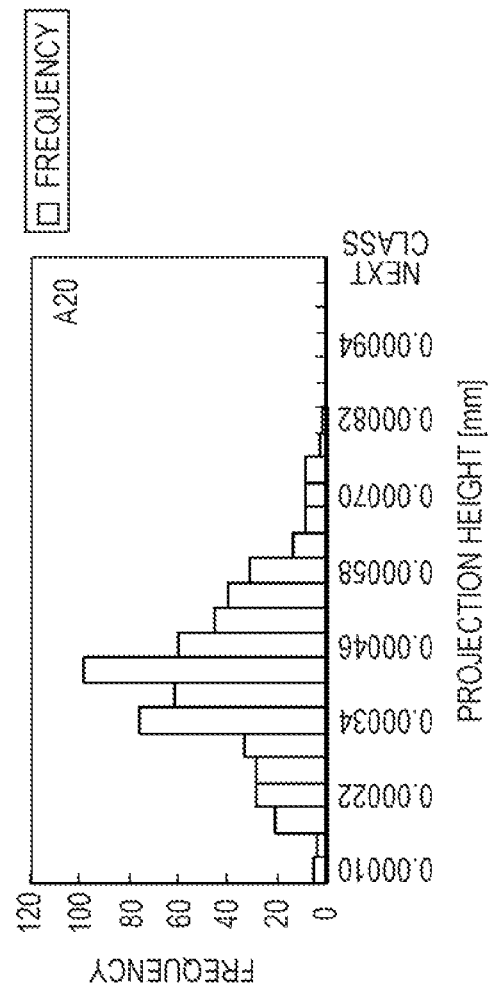
FIG. 19B is a graph showing frequency distribution of a projection height on the optical film surface of Sample 6.

Urethane acrylic oligomer: 36.6 parts by weight
Pentaerythritol tetraacrylate: 18.3 parts by weight
Silica filler (acryl-modified) having a particle size of 25 nm: 40 parts by weight
IRGACURE 184: 5 parts by weight
Fluorine-containing oligomer (bifunctional acryl): 0.1 parts by weight
BYK-410: 1.9 parts by weight
IPA: 93.7 parts by weight
Cyclohexanone: 54.4 parts by weight Subsequently, the film was stuck to a blackboard via an adhesive sheet, and glare with a fluorescent lamp was confirmed. An outline of the fluorescent lamp blurred, and anti-glare properties were revealed. Subsequently, the surface shape was evaluated by using a surface roughness measuring instrument with stylus. The evaluation results are shown in FIGS. 19A and 19B. Ra was 0.093 μm; Rz was 0.408 μm; and RSm was 144 μm. Also, a projection height with the maximum frequency on the hard coat surface was 0.82 μm; and projections higher than the projection height with the maximum frequency on the hard coat surface had a height of 0.42 μm from a central value of the projection height with the maximum frequency. It was noted from these evaluation results that adequate smoothness was formed on the hard coat layer surface, following the concave-convex shape of the substrate. This is caused due to the fact that the system was gelled in the solvent evaporation step of the foregoing ultraviolet ray-curable resin composition, whereby the adequate smoothness was formed, following the concave-convex shape of the substrate.

Also, the thus obtained optical film was stuck onto a glass plate and evaluated according to the pencil hardness test method as defined in JIS K-5400. As a result, it was noted that the hardness of the hard coat layer was 3H.

(Sample 7)

First of all, a TAC film having concaves and convexes on the surface thereof was obtained in the same manner as in Sample 6. Subsequently, the same ultraviolet ray-curable resin composition as that in Sample 6 was coated on the TAC film having concaves and convexes imparted thereto, followed by drying at 80° C. for 2 minutes. Ultraviolet rays of 350 mJ/cm$^2$ were irradiated in a nitrogen atmosphere to obtain a 6 μm-thick anti-glare hard coat film provided with anti-fouling properties.

Subsequently, the film was stuck to a blackboard via an adhesive sheet, and glare with a fluorescent lamp was confirmed. An outline of the fluorescent lamp blurred, and anti-glare properties were revealed. The surface shape was evaluated by using a surface roughness measuring instrument with stylus. As a result, Ra was 0.083 μm; Rz was 0.331 μm; and RSm was 241 μm. It was noted from these evaluation results that adequate smoothness was formed on the hard coat layer surface, following the concave-convex shape of the substrate. This is caused due to the fact that the system was gelled in the solvent evaporation step of the foregoing ultraviolet ray-curable resin composition, whereby the adequate smoothness was formed, following the concave-convex shape of the substrate.

Also, the thus obtained optical film was stuck onto a glass plate and evaluated according to the pencil hardness test method as defined in JIS K-5400. As a result, it was noted that the hardness of the hard coat layer was 3H.

(Sample 8)

First of all, a TAC film having concaves and convexes on the surface thereof was obtained in the same manner as in Sample 6. Subsequently, the following ultraviolet ray-curable resin composition was coated on the TAC film having concaves and convexes imparted thereto by using a coil bar, followed by drying at 80° C. for 2 minutes. Subsequently, ultraviolet rays of 350 mJ/cm$^2$ were irradiated in a nitrogen atmosphere to obtain a 6 μm-thick anti-glare hard coat film provided with anti-fouling properties.

Urethane acrylic oligomer: 36.6 parts by weight
Pentaerythritol tetraacrylate: 18.3 parts by weight
Silica filler (acryl-modified) having a particle size of 25 nm: 40 parts by weight
IRGACURE 184: 5 parts by weight
Fluorine-containing oligomer (bifunctional acryl): 0.1 parts by weight
BYK-410: 2.9 parts by weight
IPA: 93.7 parts by weight
Cyclohexanone: 53.4 parts by weight Subsequently, the film was stuck to a blackboard via an adhesive sheet, and glare with a fluorescent lamp was confirmed. An outline of the fluorescent lamp blurred, and anti-glare properties were revealed. Subsequently, the surface shape was evaluated by using a surface roughness measuring instrument with stylus. As a result, it was noted that adequate smoothness was formed on the hard coat layer surface, following the concave-convex shape of the substrate. This is caused due to the fact that the system was gelled in the solvent evaporation step of the foregoing ultraviolet ray-curable resin composition, whereby the adequate smoothness was formed, following the concave-convex shape of the substrate.

Also, the thus obtained optical film was stuck onto a glass plate and evaluated according to the pencil hardness test method as defined in JIS K-5400. As a result, it was noted that the hardness of the hard coat layer was 3H.

(Sample 9)

First of all, a TAC film having concaves and convexes on the surface thereof was obtained in the same manner as in Sample 6. Subsequently, the following ultraviolet ray-curable resin composition was coated on the TAC film having concaves and convexes imparted thereto by using a coil bar, followed by drying at 80° C. for 2 minutes. Ultraviolet rays of 350 mJ/cm$^2$ were irradiated in a nitrogen atmosphere to obtain a 6 μm-thick hard coat film provided with anti-fouling properties.

Figure 20:
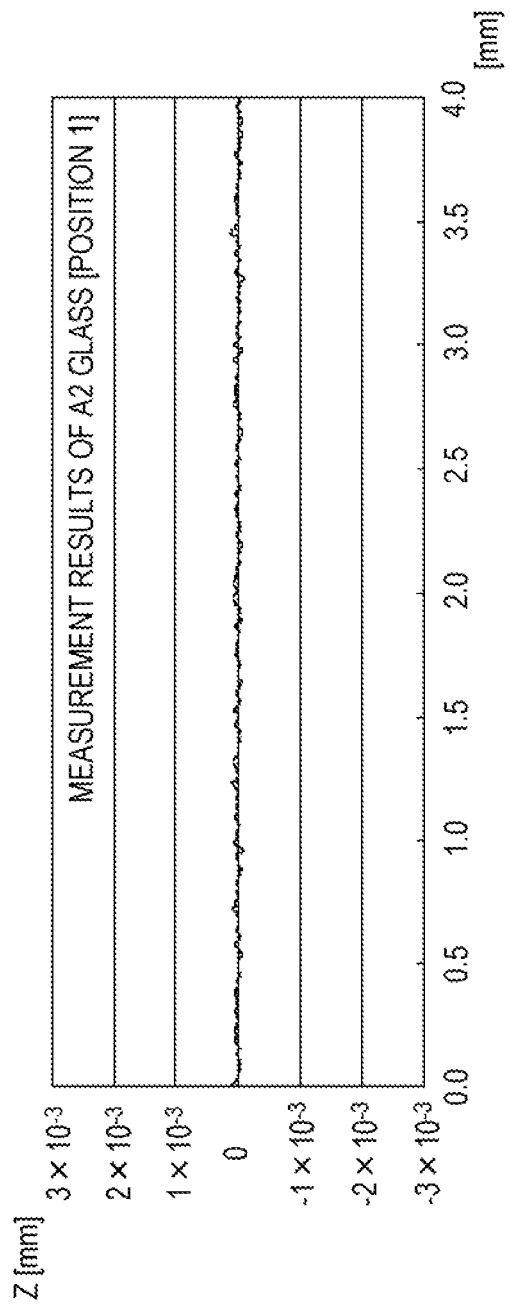
FIG. 20 is a graph showing a roughness curve of the substrate surface of Sample 9.

Urethane acrylic oligomer: 63.3 parts by weight
Pentaerythritol tetraacrylate: 31.6 parts by weight
IRGACURE 184: 5 parts by weight
Fluorine-containing oligomer (bifunctional acryl): 0.1 parts by weight
IPA: 93.7 parts by weight
Cyclohexanone: 56.3 parts by weight Subsequently, the film was stuck to a blackboard via an adhesive sheet, and glare with a fluorescent lamp was confirmed. The fluorescent lamp clearly glared, and anti-glare properties were not revealed. Subsequently, the surface shape was evaluated by using a surface roughness measuring instrument with stylus. The evaluation results are shown in FIG. 20. It is noted from these evaluation results that the concave-convex shape on the hard coat layer surface was broken. This is caused due to the fact that the system was not gelled in the solvent evaporation step of the foregoing ultraviolet ray-curable resin composition, and therefore, the foregoing ultraviolet ray-curable resin composition did not follow the concave-convex shape of the substrate, and the concave-convex shape on the hard coat layer surface was broken.

(Sample 10)

First of all, a TAC film having concaves and convexes on the surface thereof was obtained in the same manner as in Sample 6. Subsequently, the following ultraviolet ray-curable resin composition was coated on the TAC film having concaves and convexes imparted thereto by using a coil bar, followed by drying at 80° C. for 2 minutes. Ultraviolet rays of 350 mJ/cm$^2$ were irradiated in a nitrogen atmosphere to obtain a 6 μm-thick hard coat film provided with anti-fouling properties.

Urethane acrylic oligomer: 36.6 parts by weight
Pentaerythritol tetraacrylate: 18.3 parts by weight
Silica filler (acryl-modified) having a particle size of 25 nm: 40 parts by weight
IRGACURE 184: 5 parts by weight
Fluorine-containing oligomer (bifunctional acryl): 0.1 parts by weight
IPA: 93.7 parts by weight
Cyclohexanone: 56.3 parts by weight Subsequently, the film was stuck to a blackboard via an adhesive sheet, and glare with a fluorescent lamp was confirmed. The fluorescent lamp clearly glared, and anti-glare properties were not revealed. Subsequently, the surface shape was evaluated by using a surface roughness measuring instrument with stylus. As a result, it was noted that the system was not gelled in the solvent evaporation step of the foregoing ultraviolet ray-curable resin composition, and therefore, the concave-convex shape on the hard coat layer surface was broken.

(Sample 11)

First of all, a TAC film having concaves and convexes on the surface thereof was obtained in the same manner as in Sample 6. Subsequently, the following ultraviolet ray-curable resin composition was coated on the TAC film having concaves and convexes imparted thereto by using a coil bar, followed by drying at 80° C. for 2 minutes. Ultraviolet rays of 350 mJ/cm$^2$ were irradiated in a nitrogen atmosphere to obtain a 6 μm-thick hard coat film provided with anti-fouling properties.

Urethane acrylic oligomer: 63.3 parts by weight
Pentaerythritol tetraacrylate: 31.6 parts by weight
IRGACURE 184: 5 parts by weight
Fluorine-containing oligomer (bifunctional acryl): 0.1 parts by weight
BYK-410: 1.9 parts by weight
IPA: 93.7 parts by weight
Cyclohexanone: 54.4 parts by weight Subsequently, the film was stuck to a blackboard via an adhesive sheet, and glare with a fluorescent lamp was confirmed. The fluorescent lamp clearly glared, and anti-glare properties were not revealed. Subsequently, the surface shape was evaluated by using a surface roughness measuring instrument with stylus. As a result, it was noted that the system was not gelled in the solvent evaporation step of the foregoing ultraviolet ray-curable resin composition, and therefore, the concave-convex shape on the hard coat layer surface was broken.

(Sample 12)

Concaves and convexes were formed on the TAC film surface by shape transfer (embossing) of a surface shape of an embossing roll which had been prepared by blasting. A projection height with the maximum frequency on the substrate surface was 1.9 µm; projections larger than the projection height with the maximum frequency on the substrate surface had a height of 3.1 µm from a central value of the projection height with the maximum frequency; and RSm was 85 µm. Subsequently, the same ultraviolet ray-curable resin composition as that in Sample 6 was coated on the TAC film having concaves and convexes imparted thereto, followed by drying at 50° C. for 2 minutes. Ultraviolet rays of 350 mJ/cm² were irradiated in a nitrogen atmosphere to obtain a 6 µm-thick anti-glare hard coat film provided with anti-fouling properties.

Subsequently, the thus obtained optical film was stuck to a blackboard via an adhesive sheet, and glare with a fluorescent lamp was confirmed. An outline of the fluorescent lamp blurred, and anti-glare properties were revealed. However, a rough feel or a lumpy feel was confirmed in the film appearance.

(Sample 13)

Concaves and convexes were formed on the TAC film surface by shape transfer (embossing) of a surface shape of an embossing roll which had been prepared by blasting. A projection height with the maximum frequency on the substrate surface was 1.9 µm; projections larger than the projection height with the maximum frequency on the substrate surface had a height of 2.1 µm from a central value of the projection height with the maximum frequency; and RSm was 510 µm. Subsequently, the same ultraviolet ray-curable resin composition as that in Sample 6 was coated on the TAC film having concaves and convexes imparted thereto, followed by drying at 50° C. for 2 minutes. Ultraviolet rays of 350 mJ/cm² were irradiated in a nitrogen atmosphere to obtain a 6 µm-thick anti-glare hard coat film provided with anti-fouling properties.

Subsequently, the thus obtained optical film was stuck to a blackboard via an adhesive sheet, and glare with a fluorescent lamp was confirmed. The fluorescent lamp clearly glared, and anti-glare properties were not revealed.

In the light of the above, it was noted that by using an ultraviolet ray-curable resin composition containing an inorganic oxide filler and a viscosity modifier, adequate smoothness can be obtained, following the concave-convex shape on the substrate surface.

The numerical values, shapes, materials, configurations and the like described in the foregoing embodiments and working examples are merely examples, and different numerical values, shapes, materials, configurations and the like may be used, if desired.

Also, it is possible to combine the respective configurations of the foregoing Embodiments 1 to 5 with each other so far as the gist of the present invention is not deviated.

Also, in the foregoing embodiments, while the cases applied to an optical film to be provided on the display surface of a liquid crystal display and a method for manufacturing the same have been described, it should not be construed that the present invention is limited thereto. The present embodiments are applicable to an optical film to be used on the display surface of a display device of every kind inclusive of a CRT (cathode ray tube) display, a plasma display panel (PDP), an electroluminescence (EL) display, a surface-conduction electron-emitter display (SED), etc. and a method for manufacturing the same. Also, the size of the display device is not particularly limited, and is applicable to all of display devices including from small-sized display devices to large-sized display devices.

Also, in the foregoing embodiments, while the case where the optical device 1 is an optical film has been described as an example, it should not be construed that the optical device is limited to this example. The optical device can be formed into various shapes such as a plate form and a block form. In that case, the shape of the substrate may be formed into various shapes such as a plate form and a block form.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical device comprising:
a substrate having a three-dimensionally random concave-convex shape on a surface thereof; and
a hard coat layer formed on the substrate, wherein
a projection height with a maximum frequency on the substrate surface falls within a range substantially of 1.5 µm or more and not more than 10 µm;
projections larger than the projection height with the maximum frequency on the substrate surface have a height falling within +3 µm from the projection height with the maximum frequency;
projections larger than the projection height with the maximum frequency on the hard coat layer surface have a height falling within +1 µm from the projection height with the maximum frequency, wherein the maximum projection height on the hard coat layer surface is at least 4 µm and is greater than the projection height with the maximum frequency on the hard coat layer surface; and
a length RSm of a mean spacing of concaves and convexes on the substrate surface is 55 µm or more and not more than 500 µm.

2. The optical device according to claim 1, wherein
the hard coat layer contains an inorganic oxide filler and a viscosity modifier; and
the inorganic oxide filler and the viscosity modified are hydrogen-bonded or coordinate-bonded to each other.

3. The optical device according to claim 2, wherein
the inorganic oxide filler contains, as a main component, at least one member selected from the group consisting of silica, alumina, zirconia, antimony pentoxide, zinc oxide, tin oxide, indium tin oxide, indium oxide, antimony-doped tin oxide and aluminum zinc oxide; and
the viscosity modifier is a molecule containing two or more of at least one kind of substituent selected from the group consisting of a hydroxyl group, a carboxyl group, a urea group, an amide group and an amino group.

4. The optical device according to claim 2, wherein
the hard coat layer contains, as a main component, at least one member selected from the group consisting of a thermosetting resin and an ultraviolet ray-curable resin.

5. The optical device according to claim 1, wherein projections larger than the projection height with the maximum frequency on the substrate surface have a height falling within +2 μm from the projection height with the maximum frequency.

6. The optical device according to claim 1, wherein a continuous wave front is formed on the hard coat layer surface, following the concave-convex shape on the substrate surface.

7. The optical device according to claim 1, wherein the random concave-convex shape is formed by shape transfer of a master disc prepared by blasting.

8. The optical device according to claim 1, further comprising an anti-reflection layer formed on the hard coat layer.

9. The optical device according to claim 1, wherein a maximum projection height is at least 0.9 μm greater than the projection height with the maximum frequency.

10. The optical device according to claim 1, wherein the projection height with the maximum frequency on the substrate surface falls within a range of 2.2 μm or more and not more than 10 μm.

11. The optical device according to claim 1, wherein the maximum projection height on the substrate surface is at least 4 μm and is greater than the projection height with the maximum frequency.

12. An optical device comprising:
a substrate having a three-dimensionally random concave-convex shape on a surface thereof; and
a hard coat layer formed on the substrate, wherein
a projection height with a maximum frequency on the hard coat layer surface falls within a range substantially of 3 μm or more and not more than 5 μm;
projections larger than the projection height with the maximum frequency on the hard coat layer surface have a height falling within +1 μm from the projection height with the maximum frequency, wherein a maximum projection height is at least 4 μm and is greater than the projection height with the maximum frequency; and
a length RSm of a mean spacing of concaves and convexes on the hard coat layer surface is 55 μm or more and not more than 500 μm.

13. A display device comprising an optical device the optical device including:
a substrate having a three-dimensionally random concave-convex shape on a surface thereof; and
a hard coat layer formed on the substrate, wherein
a projection height with a maximum frequency on the hard coat layer surface falls within a range substantially of 3 μm or more and not more than 5 μm;
projections larger than the projection height with the maximum frequency on the hard coat layer surface have a height falling within +1 μm from the projection height with the maximum frequency, wherein a maximum projection height is at least 4 μm and is greater than the projection height with the maximum frequency; and
a length RSm of a mean spacing of concaves and convexes on the hard coat layer surface is 55 μm or more and not more than 500 μm.

* * * * *